(12) United States Patent
Nishio et al.

(10) Patent No.: US 11,102,392 B2
(45) Date of Patent: Aug. 24, 2021

(54) IMAGE PICKUP APPARATUS DETECTING FOCUS WITH PHASE DIFFERENCE DETECTION METHOD, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Akihiro Nishio, Yokohama (JP); Hideaki Takamiya, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 3 days.

(21) Appl. No.: 16/787,414

(22) Filed: Feb. 11, 2020

(65) Prior Publication Data

US 2020/0267307 A1  Aug. 20, 2020

(30) Foreign Application Priority Data

Feb. 15, 2019  (JP) .............................. JP2019-025581

(51) Int. Cl.
*H04N 5/232* (2006.01)
*H04N 5/225* (2006.01)
(Continued)

(52) U.S. Cl.
CPC ........... *H04N 5/23212* (2013.01); *G02B 7/04* (2013.01)
(Continued)

(58) Field of Classification Search
CPC ......... H04N 5/23212; H04N 5/232122; H04N 5/23287; H04N 5/369; H04N 5/3696;
(Continued)

(56) References Cited

U.S. PATENT DOCUMENTS 8,633,992 B2 * 1/2014 Tsukada ................. H04N 5/228
348/208.12
10,171,721 B2 * 1/2019 Olsson et al. ..... H04N 5/23212
(Continued)

FOREIGN PATENT DOCUMENTS

JP  2009-244862 A  10/2009
JP  2015-011283 A   1/2015
JP     6210824 B2  10/2017

*Primary Examiner* — Marly S Camargo
(74) *Attorney, Agent, or Firm* — Cowan, Liebowitz & Latman, P.C.

(57) ABSTRACT

An image pickup apparatus that is capable of obtaining a defocus amount for focus detection with high accuracy at high speed with a simple configuration even in a time of image stabilization. The image pickup apparatus including a memory device that stores a set of instructions, and at least one processor that executes the set of instructions to obtain optical parameters about an image pickup optical system and an image sensor as reference information, correct the reference information based on a relative moving amount of the image sensor with respect to an optical axis of the image pickup optical system, obtain a control parameter corresponding to corrected reference information by referring to an information data set that stores the control parameter used for finding a defocus amount for focus detection in association with the reference information, and find the defocus amount based on the control parameter obtained.

21 Claims, 18 Drawing Sheets

(51) Int. Cl.
*H04N 5/238* (2006.01)
*H04N 5/357* (2011.01)
*H04N 5/369* (2011.01)
*H04N 5/374* (2011.01)
*H04N 9/09* (2006.01)
*H04N 9/31* (2006.01)
*H04N 9/07* (2006.01)
*G02B 7/04* (2021.01)
*G02B 7/36* (2021.01)
*H01L 27/146* (2006.01)
*G06T 5/00* (2006.01)

(58) Field of Classification Search
CPC .. H04N 5/36961; H04N 5/374; H04N 5/2257;
H04N 5/2254; H04N 5/238; H04N
5/357721; H04N 5/3572; H04N 9/045;
H04N 9/077; H04N 9/3182; G06T 5/006;
G06T 7/507; H01L 27/14627

USPC .......... 348/349, 345, 340, 208.12, 335, 251,
348/615, 294; 382/174, 274; 257/98, 72,
257/432, 291, 292, 435, 294; 438/70
See application file for complete search history.

(56) References Cited

U.S. PATENT DOCUMENTS

| | | | |
|---|---|---|---|
| 2012/0133821 A1* | 5/2012 | Takiwa | H04N 5/232 348/345 |
| 2012/0300104 A1* | 11/2012 | Onuki | 348/302 |
| 2014/0139725 A1* | 5/2014 | Nagano | H04N 5/232 348/354 |
| 2015/0002838 A1* | 1/2015 | Fukuda | 356/123 |
| 2016/0212325 A1* | 7/2016 | Kikuchi | H04N 5/23212 348/251 |
| 2020/0275034 A1* | 8/2020 | Takamiya | H04N 5/23209 |

* cited by examiner

FIG. 7A
FIG. 7B
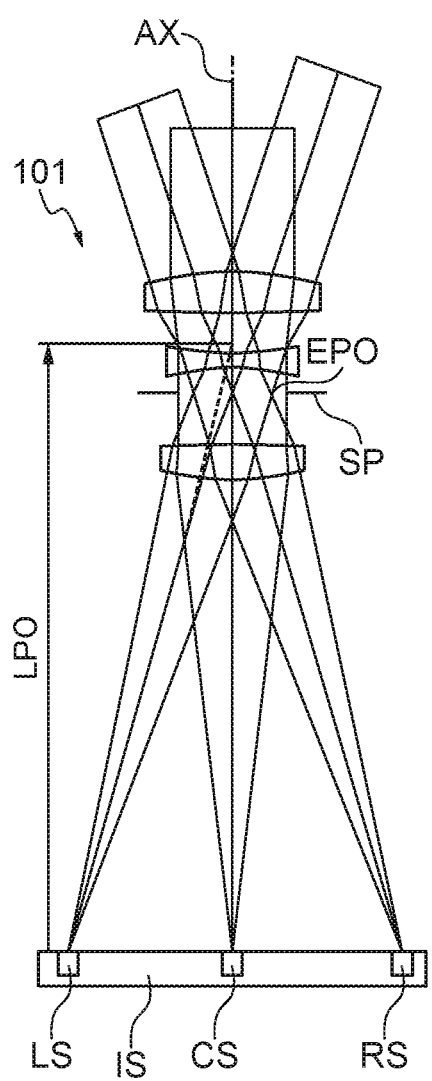
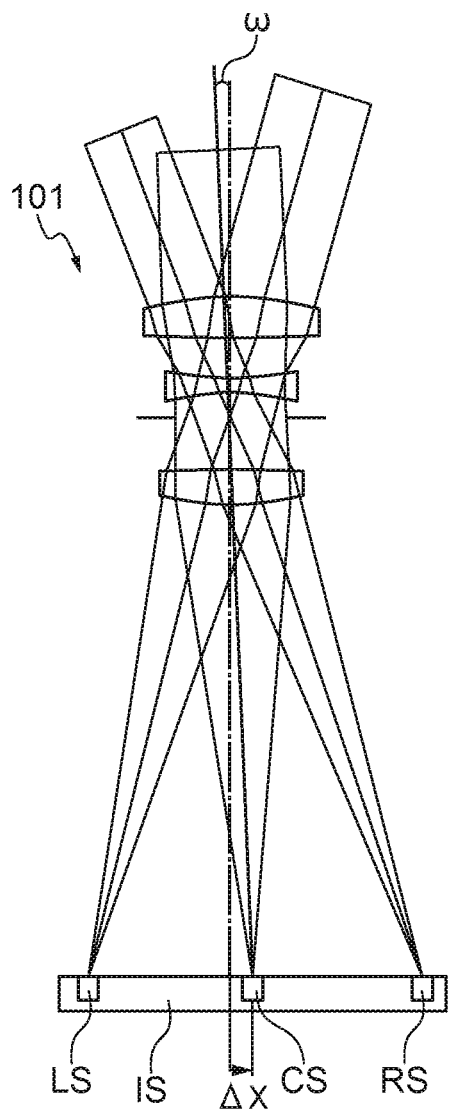

FIG. 13A

- S13A1: OBTAIN EXIT PUPIL POSITION AND APERTURE VALUE OF IMAGE PICKUP OPTICAL SYSTEM, X-Y COORDINATE INFORMATION ABOUT FOCUS DETECTION PIXEL
- S13A2: OBTAIN MOVING AMOUNT OF IMAGE SENSOR
- S13A3: CORRECT X-Y COORDINATE AND EXIT PUPIL POSITION
- S13A4: SEARCH BASELINE-LENGTH-INFORMATION TABLE
  - PUPIL POSITION OF IMAGE SENSOR
  - EXIT PUPIL POSITION OF IMAGE PICKUP OPTICAL SYSTEM
  - APERTURE VALUE
  - X COORDINATE
  - Y COORDINATE
  - BASELINE LENGTH
- S13A5: OBTAIN BASELINE LENGTH

FIG. 13B

- S13B1: OBTAIN EXIT PUPIL POSITION AND APERTURE VALUE OF IMAGE PICKUP OPTICAL SYSTEM, X-Y COORDINATE INFORMATION ABOUT FOCUS DETECTION PIXEL
- S13B2: OBTAIN MOVING AMOUNT OF IMAGE SENSOR
- S13B3: CORRECT EXIT PUPIL POSITION AND APERTURE VALUE
- S13B4: SEARCH BASELINE-LENGTH-INFORMATION TABLE
  - EXIT PUPIL POSITION OF IMAGE PICKUP OPTICAL SYSTEM
  - APERTURE VALUE
  - X COORDINATE
  - Y COORDINATE
  - BASELINE LENGTH
- S13B5: OBTAIN BASELINE LENGTH

FIG. 13C

- S13C1: OBTAIN EXIT PUPIL POSITION AND APERTURE VALUE OF IMAGE PICKUP OPTICAL SYSTEM, X-Y COORDINATE INFORMATION ABOUT FOCUS DETECTION PIXEL
- S13C2: OBTAIN MOVING AMOUNT OF IMAGE SENSOR
- S13C3: CORRECT EXIT PUPIL POSITION
- S13C4: SEARCH BASELINE-LENGTH-INFORMATION TABLE
  - EXIT PUPIL POSITION OF IMAGE PICKUP OPTICAL SYSTEM
  - APERTURE VALUE
  - X COORDINATE
  - Y COORDINATE
  - BASELINE LENGTH
- S13C5: OBTAIN BASELINE LENGTH
- S13C6: CORRECT BASELINE LENGTH
- S13C7: OBTAIN BASELINE LENGTH

FIG. 15
FIRST PUPIL INTENSITY
DISTRIBUTION
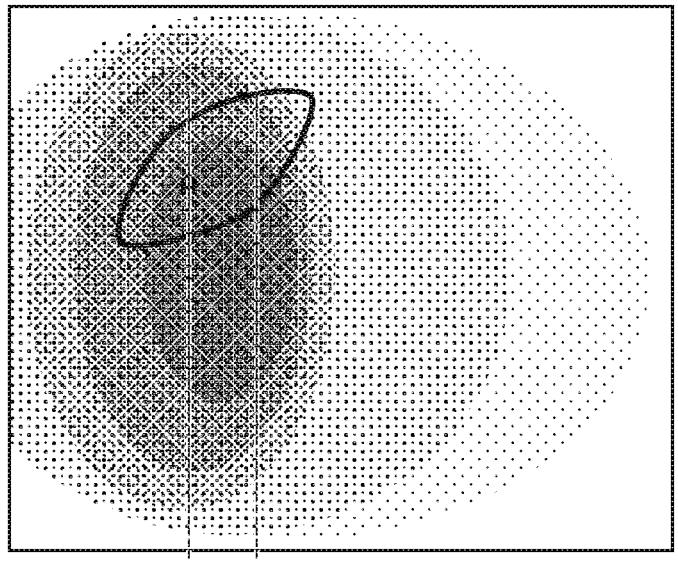
SECOND PUPIL INTENSITY          BASELINE LENGTH L
DISTRIBUTION
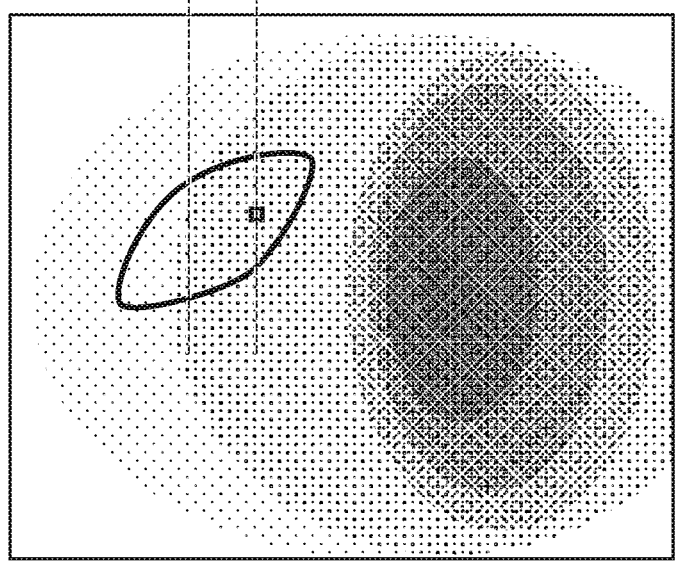

| | | MOVING AMOUNT OF IMAGE STABILIZATION OPTICAL SYSTEM | | | |
|---|---|---|---|---|---|
| | | 1mm | 2mm | 3mm | 4mm |
| RELATIVE ANGLE TO MOVING DIRECTION OF OPTICAL SYSTEM | 0deg | 1.05 | 1.1 | 1.2 | 1.3 |
| | 180deg | 0.95 | 0.9 | 0.85 | 0.8 |

IMAGE PICKUP APPARATUS DETECTING FOCUS WITH PHASE DIFFERENCE DETECTION METHOD, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus that detects a focus with a phase difference detection method, a control method therefor, and a storage medium storing a control program therefor.

Description of the Related Art

An image pickup apparatus that detects a focus with an image plane phase difference detection method (an image pickup plane phase difference detection method) is proposed in recent years. In the image plane phase difference detection method, focus detection signals are obtained on the basis of signals of focus detection pixels arranged on an image pickup surface of an image sensor, and focus detection and a focusing operation are executed using the obtained focus detection signals. Moreover, an image pickup apparatus that performs image stabilization for correcting image blur due to camera shake during exposure in order to improve quality of a picked-up image is proposed. There are two image stabilization methods including a sensor shift method that performs the image stabilization by moving an image sensor in a direction perpendicular to an optical axis of an image pickup optical system and a lens shift method that performs the image stabilization by moving a correction optical system (a shift optical system) in the image pickup optical system.

An image pickup apparatus employing the image plane phase difference detection system calculates a defocus amount on the basis of an image displacement amount obtained by a correlation operation using focus detection signals and a conversion coefficient, and calculates a focus driving amount on the basis of the calculated defocus amount. The above conversion coefficient is a value calculated on the basis of parameters including a base length. Accordingly, the defocus amount is calculated with sufficient accuracy by obtaining the parameters like the baseline length correctly.

In the meantime, when an image pickup apparatus performs the image stabilization, the relative positional relationship between an optical axis position of an image pickup optical system and an image sensor varies, which changes the parameters like the baseline length. Accordingly, even in the time of image stabilization, a defocus amount is calculated with sufficient accuracy by correcting the parameters including the baseline length appropriately.

Japanese Patent No. 6210824 discloses a focusing apparatus that beforehand stores information about an exit angle range of a light beam exited from an image pickup optical system toward a focus detection pixel for every image height. A calculation unit of the focusing apparatus calculates corrected exit angle range information on the basis of the stored exit angle range information and movement information, and calculates information for the focusing on the basis of the corrected exit angle range information and characteristic information about an image sensor.

However, when the focusing is performed on the basis of the corrected exit angle range information and the characteristic information about the image sensor while the calculation unit corrects the exit angle range information in realtime as described in the above-mentioned patent, processing load of the calculation unit may become excessive. If the processing load of the calculation unit is excessive, information communication within the apparatus may be delayed, which may lower the focusing accuracy because the parameters may not be corrected suitably in a timely manner.

SUMMARY OF THE INVENTION

The present invention provides an image pickup apparatus, a control method therefor, and a storage medium storing a control program therefor, which are capable of obtaining a defocus amount for focus detection with high accuracy at high speed with a simple configuration even in a time of image stabilization.

Accordingly, a first aspect of the present invention provides an image pickup apparatus including a memory device that stores a set of instructions, and at least one processor that executes the set of instructions to obtain optical parameters about an image pickup optical system and an image sensor as reference information, correct the reference information based on a relative moving amount of the image sensor with respect to an optical axis of the image pickup optical system, obtain a control parameter corresponding to corrected reference information by referring to an information data set that stores the control parameter used for finding a defocus amount for focus detection in association with the reference information, and find the defocus amount based on the control parameter obtained.

Accordingly, a second aspect of the present invention provides a control method for an image pickup apparatus, the control method including obtaining optical parameters about an image pickup optical system and an image sensor as reference information, correcting the reference information based on a relative moving amount of the image sensor with respect to an optical axis of the image pickup optical system, obtaining a control parameter corresponding to corrected reference information by referring to an information data set that stores the control parameter used for finding a defocus amount for focus detection in association with the reference information, and finding the defocus amount based on the control parameter corresponding to corrected reference information.

Accordingly, a third aspect of the present invention provides a non-transitory computer-readable storage medium storing a control program causing a computer to execute the control method of the second aspect.

According to the present invention, the defocus amount for focus detection is obtainable with high accuracy at high speed with a simple configuration even in the time of the image stabilization.

Further features of the present invention will become apparent from the following description of exemplary embodiments with reference to the attached drawings.

BRIEF DESCRIPTION OF THE DRAWINGS

FIG. 7A and FIG. 7B are views showing positional relationships between an image pickup optical unit and the image sensor, and incident light paths in the first embodiment.

FIG. 13A, FIG. 13B, and FIG. 13C are flowcharts showing reference information correction processes in the first embodiment.

FIG. 15 is an explanatory view showing pixel intensity distributions and projection positions of a diaphragm frame in a second embodiment of the present invention.

DESCRIPTION OF THE EMBODIMENTS

Figure 1:
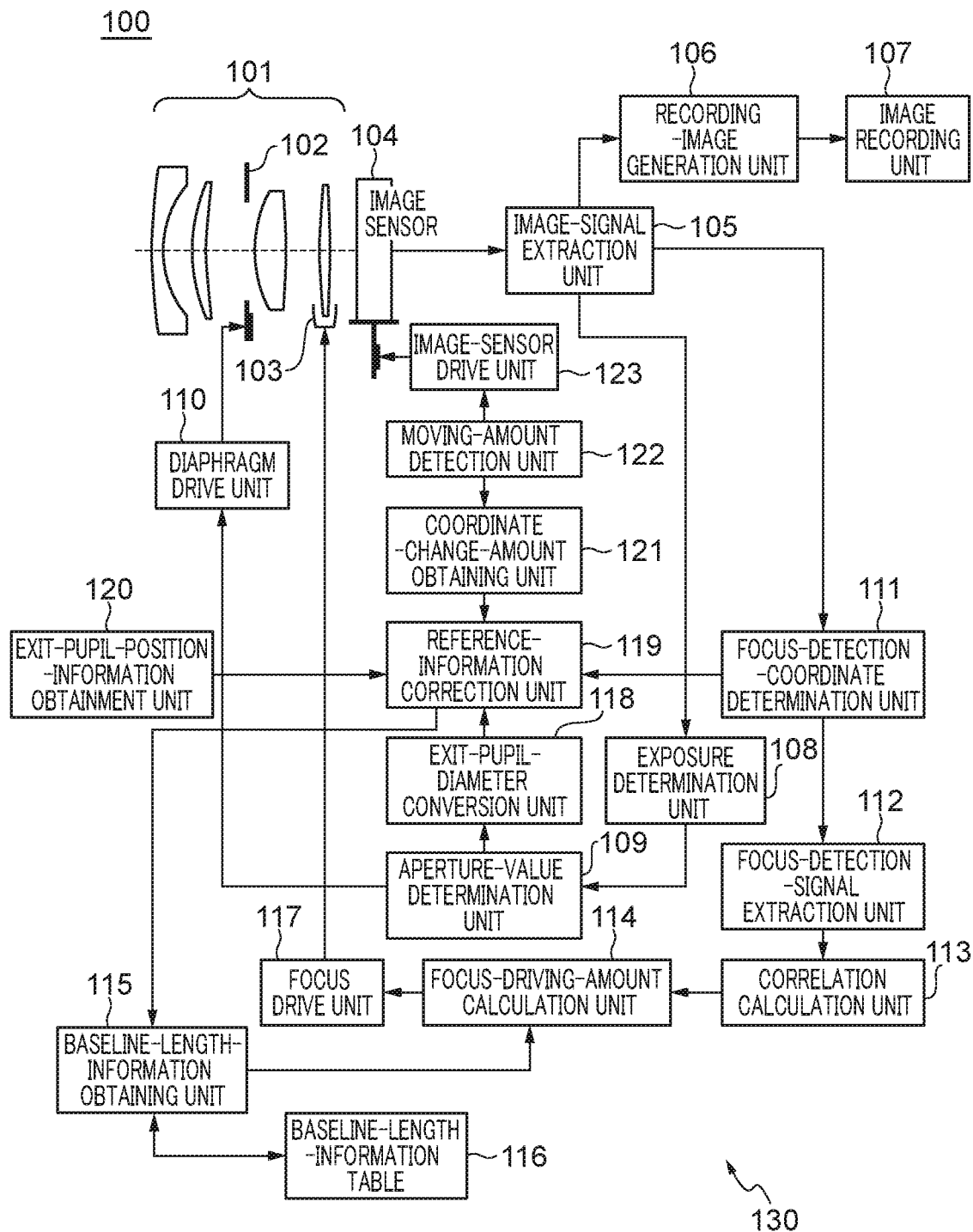
FIG. 1 is a block diagram schematically showing an image pickup apparatus concerning a first embodiment of the present invention.

Hereafter, embodiments according to the present invention will he described in detail by referring to the drawings. It should be noted that embodiments described below are merely examples of configurations that can achieve the present invention. The following embodiments can be corrected or changed suitably according to a configuration of an apparatus to which the present invention is applied and various conditions. Accordingly, the scope of the present invention is not limited by the configuration described in the following embodiments.

An image pickup apparatus 100 of the first embodiment can be applied to various electronic camera apparatuses, such as a digital still camera, a digital video camera, a surveillance camera, an industrial use camera, and a camera for medical use. Moreover, the image pickup apparatus 100 of this embodiment can be applied to various information processing apparatuses, such as a smart phone and a tablet terminal, that have an image pickup function.

FIG. 1 is a block diagram schematically showing a configuration of the image pickup apparatus 100 concerning the embodiments of the present invention. In order to simplify the description, parts that are unnecessary to describe the embodiment among configurations of the image pickup apparatus 100 are suitably omitted. Hereinafter, an image pickup apparatus in which an image pickup optical unit is exchangeable to an apparatus body having an image sensor will be exemplified and described in this embodiment. However, the following description can be applied to an image pickup apparatus in which an image pickup optical unit is unified to an apparatus body.

The image pickup optical unit (image pickup optical system) 101 has an iris diaphragm 102 that adjusts exposure and a focus lens group 103 that moves in an optical axis direction to change an image forming position.

An image sensor 104 has a CMOS (complementary metal oxide semiconductor) sensor that obtains a signal by performing photoelectric conversion and a peripheral circuit that processes and outputs the signal. The image sensor 104 is a two-dimensional single plate color sensor that has a square matrix pixel arrangement that has M pixels in a lateral direction (a horizontal direction) and N pixels in a longitudinal direction (a vertical direction) on which a primary-color mosaic filter of the Bayer arrangement is formed by on-chip. In the image pickup pixels of the image sensor 104, pixels (focus detection pixels) used for focus detection are arranged (a detailed configuration is mentioned later). That is, the image pickup apparatus 100 of this embodiment supports the focus detection of the image plane phase difference detection method (image pickup surface phase difference detection method).

A light ray passing through the image pickup optical unit 101 is received by the image sensor 104. An object image obtained through the image pickup optical unit 101 is formed on the image sensor 104. The image sensor 104 outputs a signal equivalent to the object image by performing photoelectric conversion. An image-signal extraction unit 105 extracts an image signal by shaping the signal output from the image sensor 104 and by eliminating an unnecessary signal. The extracted image signal is supplied to a recording-image generation unit 106, an exposure determination unit 108, and a focus-detection-coordinate determination unit 111.

The recording-image generation unit 106 records the image signal supplied from the image-signal extraction unit 105 in the image recording unit (a recording medium) 107.

The exposure determination unit 108 refers to signal intensity of the image signal supplied from the image-signal extraction unit 105. An aperture-value determination unit 109 determines an aperture value on the basis of the referred signal intensity so as to be correct exposure. The diaphragm drive unit 110 adjusts an aperture diameter of the iris diaphragm 102 on the basis of the determined aperture value.

The focus-detection-coordinate determination unit 111 determines a coordinate (focus detection coordinate) of a focus detection pixel. It should be noted that the focus detection coordinate may be arbitrarily selected by a user or may be automatically selected within the image pickup apparatus 100. A focus-detection-signal extraction unit 112 extracts focus detection signals from the focus detection pixel of the determined coordinate. A correlation calculation unit 113 detects phase difference (hereinafter it may be referred to as an "image displacement amount") of a pair of correlation signals as the extracted focus detection signals.

A baseline-length-information obtaining unit (an information obtaining unit) 115 searches a baseline-length-information table (an information data set) 116 that is stored in a memory of the image pickup apparatus 100 for the baseline length by referring to an image pickup optical condition and the focus detection coordinate at the time of focus detection as the reference information. The image pickup optical conditions are optical parameters that show an exit pupil distance and an aperture value (an F number). It should be noted that information about a light beam vignetting condition of the image pickup optical unit 101 in a peripheral area of the image sensor 104 for every aperture value may be added to the image pickup optical conditions. This additional information enables obtainment of the baseline length as a control parameter with more sufficient accuracy.

As mentioned above, the baseline-length-information table 116, which can store data elements in a matrix-form table structure, stores a baseline length as a control parameter in association with reference information including an optical parameter and a focus detection coordinate. However, an arbitrary data structure that can store a control parameter in association with reference information may be employed as the information data set in place of the baseline-length-information table 116 having a table structure.

A focus-driving-amount calculation unit (focus controller) 114 calculates a defocus amount by using the phase difference (image displacement amount) detected by the correlation calculation unit 113, the baseline length that is obtained by the baseline-length-information obtaining unit 115, and an exit pupil distance mentioned later. Then, the focus driving amount calculation unit 114 calculates a focus driving amount on the basis of the defocus amount. A focus drive unit 117 drives the focus lens group 103 according to the calculated focus driving amount.

An exit-pupil-diameter conversion unit 118 calculates an exit pupil diameter on the basis of the aperture value that is determined by the aperture-value determination unit 109 and supplies the exit pupil diameter calculated to a reference-information correction unit 119. An exit-pupil-position-information obtaining unit 120 obtains an exit pupil position of the image pickup optical system and supplies it to the reference-information correction unit 119. A moving-amount detection unit 122 detects a moving amount of the image sensor 104 that is moved by an image-sensor drive unit (a relative moving unit) 123 for image stabilization. A coordinate-change-amount obtaining unit 121 obtains a coordinate change amount (a moving amount from a reference state) of a focus detection pixel on the basis of the detected moving amount and supplies it to the reference-information correction unit 119.

The reference-information correction unit 119 corrects the reference information on the basis of the coordinate change amount and the information about the exit pupil that are supplied as mentioned above and supplies the reference information corrected to the baseline-length-information obtaining unit 115. Since the reference information is corrected appropriately as mentioned above, the accuracy of the baseline length as the control parameter that is obtained by the baseline-length-information obtaining unit (information obtaining unit) 115 improves more, which enables the focus-driving-amount calculation unit 114 to calculate the focus driving amount with more sufficient accuracy. As a result, since the number of the focus drive operations is reduced, a high-speed focusing operation is achievable while maintaining the focusing accuracy.

A controller 130 logically contains and integrally controls the above-mentioned units (functional blocks), and executes various functions that are not mentioned above. The above-mentioned units (functional blocks) are achieved in a microcontroller including components, such as a CPU (Central Processing Unit), a ROM (Read Only Memory), and a RAM (Random Access Memory), when the CPU runs a program stored in the ROM.

Figure 2:
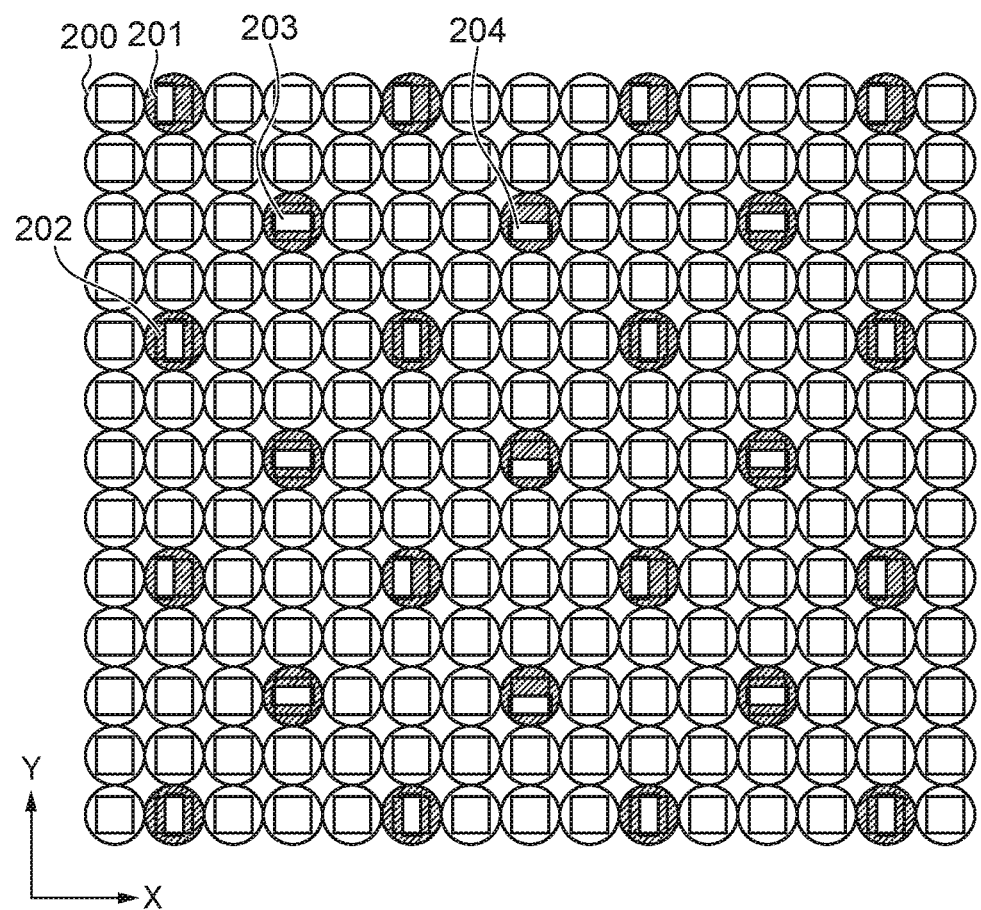
FIG. 2 is a view showing a pixel arrangement of an image sensor concerning the first embodiment.

A configuration and a light receiving characteristic of a focus detection pixel of the image sensor 104 concerning this embodiment will be described by referring to FIG. 2, FIG. 3, and FIG. 4. FIG. 2 exemplifies a pixel arrangement structure in the image sensor 104. In FIG. 2, a left-and-right direction (a horizontal direction) shall be an X-direction and an up-and-down direction (a vertical direction) shall be a Y-direction. The same definitions are used also in FIG. 3 and FIG. 4 mentioned later.

An image pickup pixel 200 is used for forming a picked-up image. In the meantime, focus detection pixels 201, 202, 203, and 204 are used for focus detection. Each focus detection pixel has a shading structure that is disclosed in Japanese Laid-Open Patent Publication (Kokai) No. 2009-244862 (JP 2009-244862A), for example.

A focus position of an object with a vertical stripe pattern is detected by performing correlation calculation of the phase difference detection method based on output signal waveforms (a pair of pixel signals) of the focus detection pixels 201 and 202 (two photoelectric conversion parts) aligned in the Y-direction in FIG. 2. Similarly, a focus position of an object with a horizontal stripe pattern is detected by performing correlation calculation of the phase difference detection method based on output signal waveforms of the focus detection pixels 203 and 204 (two photoelectric conversion parts) aligned in the X-direction.

Figure 3:
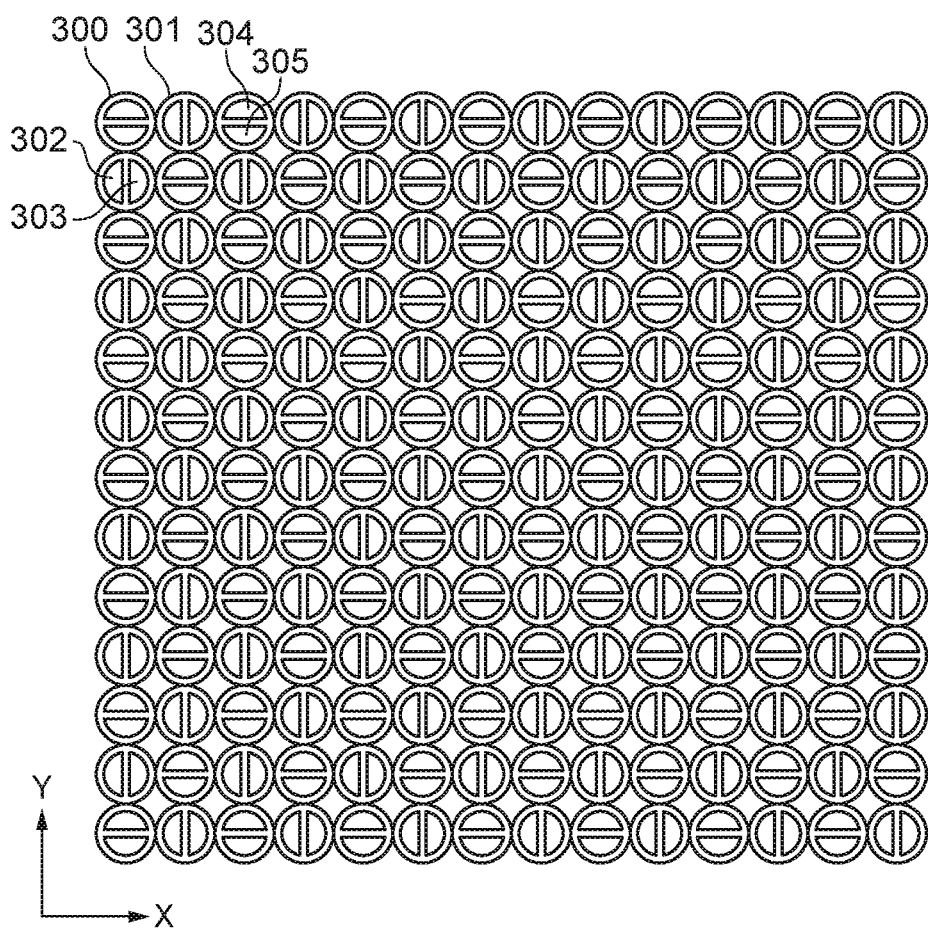
FIG. 3 is a view showing another pixel arrangement of the image sensor concerning the first embodiment.

FIG. 3 exemplifies another pixel arrangement structure in the image sensor 104. Each of pixels 300 and 301 in FIG. 3 is used for both the image formation and the focus detection. In the image sensor 104 in FIG. 3, two photoelectric conversion parts (sub-pixels) are arranged per one microlens. A pixel 301 of which sub-pixels 302 and 303 are adjacent in the X-direction and a pixel 300 of which sub-pixels 304 and 305 are adjacent in the Y-direction are alternately arranged. Signals output from sub-pixels 302 and 303 adjacent in the X-direction within the pixel 301 are used for the correlation calculation as a pair of pixel signals representing phase difference information, and focus detection of an object with a stripe pattern in the Y-direction is performed.

Similarly, signals output from sub-pixels 304 and 305 adjacent in the Y-direction within the pixel 300 are used for the correlation calculation as a pair of pixel signals, and focus detection of an object with a stripe pattern in the X-direction is performed. In the meantime, when a picked-up image is formed, a picked-up image signals can be obtained by adding the signals from the sub-pixels 302 and 303, and the signals from the sub-pixels 304 and 305, respectively.

Figure 4:
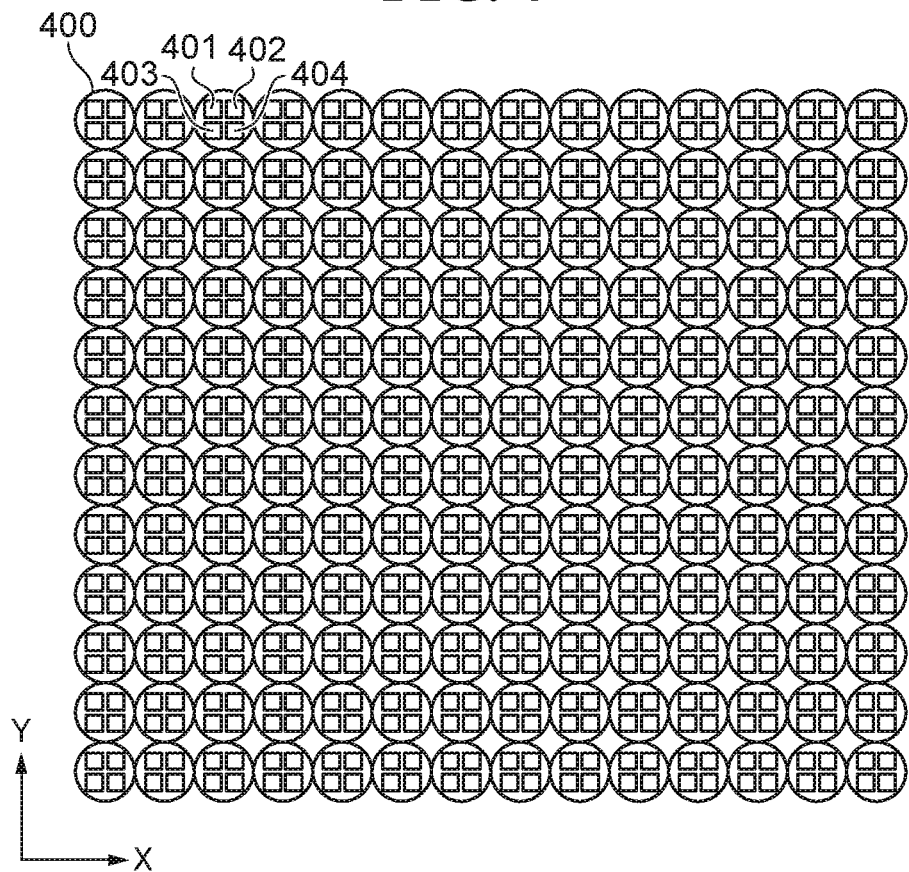
FIG. 4 is a view showing still another pixel arrangement of the image sensor concerning the first embodiment.

FIG. 4 exemplifies still another pixel arrangement structure in the image sensor 104. Pixels 400 in FIG. 4 are used for both the image formation and the focus detection. In the image sensor 104 in FIG. 4, four photoelectric conversion parts (sub-pixels) a per one microlens. The same pixel characteristic as that in FIG. 3 is achievable by changing the addition method of electrical signals from the four photoelectric conversion parts of each pixel 400.

When a focus of an object with a stripe pattern in the Y-direction is detected, signals of sub-pixels 401 and 402 adjacent in the X-direction are added and signals of sub-pixels 403 and 404 are added, and the obtained added signal waveforms of two lines are used for the correlation calculation as phase difference information about a pair of pixel signals. Moreover, when a focus of an object with a stripe pattern in the X-direction is detected, signals of the sub-pixels 401 and 403 adjacent in the Y-direction are added and signals of the sub-pixels 402 and 404 are added, and the obtained added signal waveforms of two columns are used for the correlation calculation as phase difference information about a pair of pixel signals.

The above-mentioned two kinds of addition methods for the focus detection may be changed for every block of the image sensor 104 when the image sensor is divided into blocks. A pixel arrangement structure equivalent to the configuration shown in FIG. 3 can he attained by changing the addition methods alternately in alternate sequence, Since the above-mentioned configuration is able to estimate an object with a vertical stripe pattern and an object with a horizontal stripe pattern simultaneously, direction dependency of an object pattern for the focus detection can be removed or reduced.

Moreover, the addition method may be switched according to a photographing condition, and the addition method for all the pixels may be serially switched. Since the focus detecting pixels for detecting a focus of an object with a pattern in the same direction are in a dense state in the above-mentioned configuration, a problem that cannot detect an object with thin lines near an in-focus state and occurs when the focus detection pixels are sparse is avoidable. It should be noted that the signals from the sub-pixels 401 through 404 are added when using as an image pickup signal.

By employing the above-mentioned structures of the image sensor 104, separation of a part of an object light through an image pickup optical system for a focus detection optical system required in a conventional phase difference detection method becomes unnecessary. With the above configuration, since the image sensor 104 receives an object light in real time, live view capturing is available while monitoring an object image that is a target of image recording. Moreover, the focus detection of the phase difference detection method without using a separation mechanism for an object light, which is impossible in a conventional video capturing, becomes possible.

Figure 5:
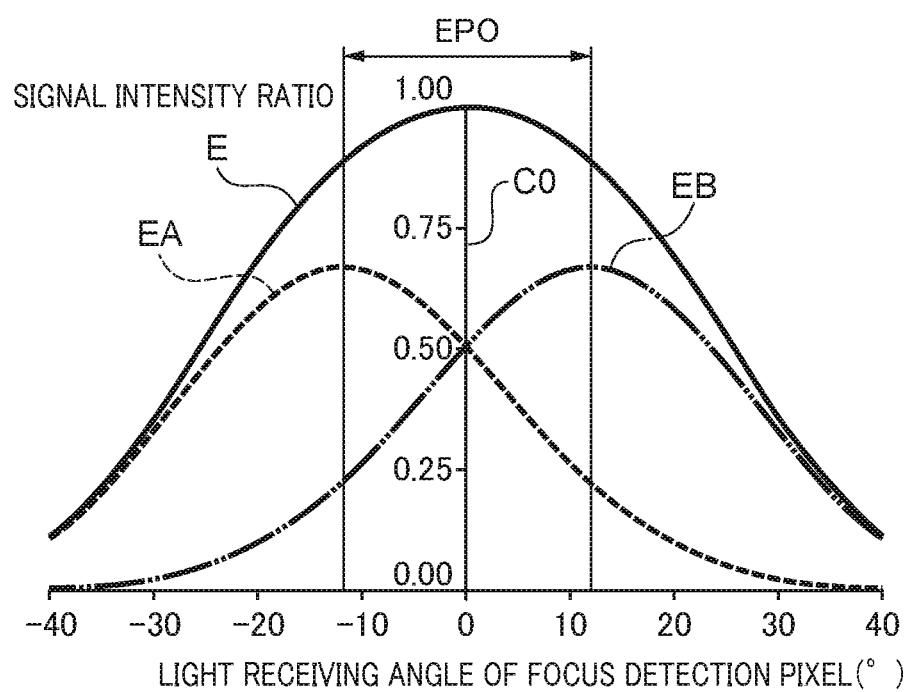
FIG. 5 is a pupil intensity distribution characteristic graph showing a relationship between a light receiving angle and signal intensity in the first embodiment.

FIG. 5 is an output characteristic graph showing a relationship between a light receiving angle and signal intensity in each of the above-mentioned focus detection pixels 201, 202, 203, 204, 300, 301 and 400. In FIG. 5, the light receiving angle in a focus detection pixel is represented by a horizontal axis (an X-axis) and a signal intensity ratio is represented by a vertical axis (a Y-axis). Henceforth, the characteristic as shown in FIG. 5 may be referred to as a "pupil-intensity-distribution characteristic".

Curves EA and EB shown in FIG. 5 respectively represent the intensity characteristics of the pair of the pixel signals depending on the variation of the light receiving angle. The curve E shows intensity characteristic of the image pickup signal that is an additional value of the characteristics represented by the curves EA and EB. As shown in FIG. 5, the two curves EA and EB cross at a position C0 at which the incident angle (light receiving angle) to a pixel is 0 degrees. The position C0 corresponding to the intersection of the curves EA and EB shall be a center position of the pupil intensity distribution. Signal intensity of a focus detection pixel is represented by an integration value of the signal intensity within a light receiving angle range.

A pair of correlation signals are obtained by scanning the pixel signals that have the above-mentioned characteristics in a correlation direction. Accordingly, the shape of the obtained correlation signal is related to the light receiving angle range in the above pixel pupil intensity distribution. The light receiving angle range depends on the exit pupil position and exit pupil diameter of the image pickup optical system.

The light receiving signals from a pair of the focus detection pixels of the above-mentioned pixel arrangement structures shall be referred to as an "A-image signal" and a "B-image signal", respectively. The focus detection of the phase difference detection method overlaps an A-image signal waveform and a B-image signal waveform corresponding to the A-image signal and B-image signal by shifting the relative position. The signal intensity of the curve EA in FIG. 5 corresponds to the A-image signal, and the signal intensity of the curve EB corresponds to the B-image signal. The A-image signal and the B-image signal are obtained by scanning and integrating the respective signal intensity in the correlation direction (X-direction).

For example, the state where the area (integration value) of the overlapped part of the waveforms is maximized is considered as the mostly correlated state (the correlation value is maximized). The defocus amount is detected (calculated) on the basis of the relative deviation amount (image displacement amount) between the A-image and the B-image that will go into the above-mentioned state. It should be noted that a distance between a centroid of the A-image signal and a centroid of the B-image signal may be calculated as the image displacement amount as a simpler method. Hereafter, the distance between the centroids is employed as the image displacement amount in the description of this embodiment.

A method of calculating a defocus amount from an image displacement amount using baseline length information as a control parameter is generally used. When the focus-driving-amount calculation unit 114 calculates a defocus amount, the image pickup apparatus 100 has a need to beforehand store a pupil separation width of a pair of focus detection pixels described by referring to FIG. 2, FIG. 3, and FIG. 4 as the baseline length information. In an in-focus state, the image displacement amount at a pupil position approximately coincides with the baseline length. In the meantime, in an out-of-focus state, the image displacement amount at the pupil position varies approximately in proportion to the defocus amount. Accordingly, the defocus amount is proportional to a value that is the image displacement amount divided by the baseline length.

Figure 6:
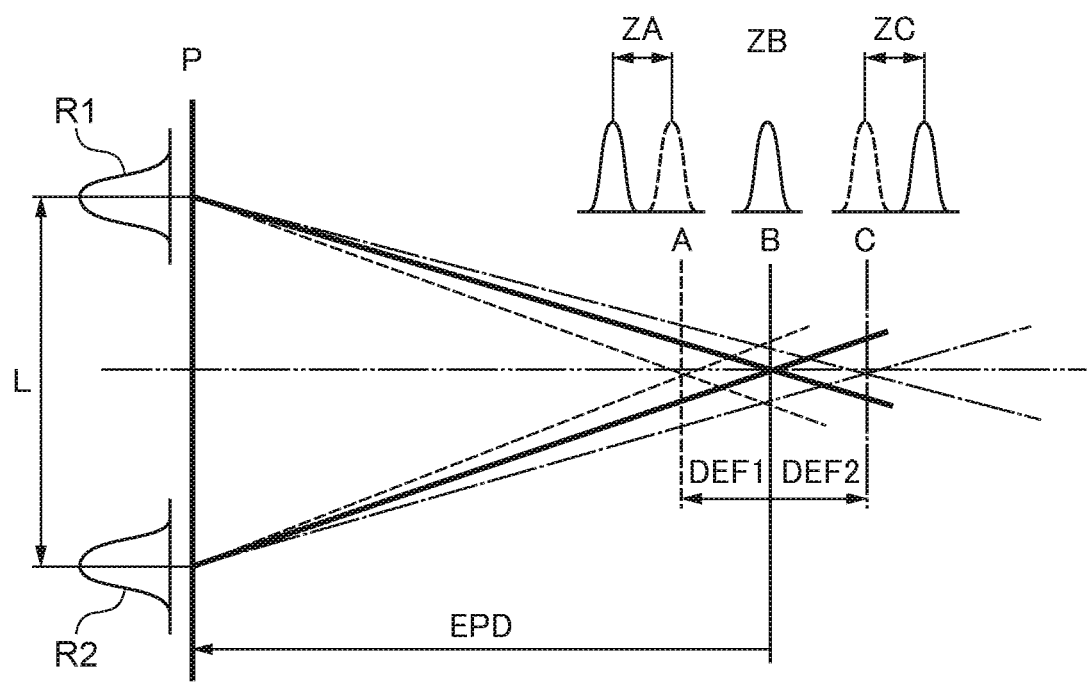
FIG. 6 is a view showing a relationship between conditions of signals from focus detection pixels, centroid points of light receiving angle ranges, and baseline length in the first embodiment.

The above-mentioned calculation of the defocus amount will be described in detail by referring to FIG. 6. FIG. 6 is a view showing a relationship between conditions of signals from focus detection pixels, centroid points of light receiving angle ranges, and baseline length, In FIG. 6, a position P is the exit pupil position corresponding to the exit pupil distance of the image pickup optical system, and positions A, B, and C show focus positions. The position B shows the position (in-focus position) of the image sensor 104. The position A is equivalent to what is called a front focus state, and the defocus amount at the position A is represented by DEF1 (a minus value). In the meantime, the position C is equivalent to what is called a back focus state, and the defocus amount at the position C is represented by DEF2 (a plus value).

The focus detection signals (correlation signals) that will be described in detail are obtained from the image sensor 104 that has the pixel structure described by referring to FIG. 2. FIG. 3, or FIG. 4, In FIG. 6. the position P is the position (a position of the diaphragm) corresponding to the exit pupil distance EPI) from the in-focus position B. An image displacement amount ZA is needed when obtaining correlation from the phase difference information about a pair of pixel signals that are photoelectric conversion signals from the focus detection pixels in the front focus state (the focus position A). A correlation signal ZB is equivalent to two focus detection signals of which waveforms overlap in the in-focus position B, and shows the state where the image displacement does not occur. An image displacement amount ZC in the rear focus state (focus position C) shows a state where the positions of the two focus detection signals for the image displacement amount ZA are exchanged.

Distributions R1 and R2 respectively show signal intensity distributions that are formed by reversely projecting the signal intensity characteristics of the pair of focus detection pixels with the light receiving angle to a plane at the position P corresponding to the exit pupil distance EPD of the image pickup optical system from the focus detection pixels. By finding the centroid points of the signal intensity distributions R1 and R2, the distance (interval amount) between the centroid points is obtained as the baseline length L. The baseline length L is determined in accordance with the aperture value AP, the exit pupil diameter, and the exit pupil distance EPD of the image pickup optical system. The exit pupil diameter depends on the aperture value AP (F value) and the exit pupil distance EPD of the image pickup optical system. Accordingly, the baseline length L is determined in accordance with the aperture value AP and the exit pupil distance EPI) of the image pickup optical system.

When based on the relationship mentioned above, the baseline length L, exit pupil distance EPD, image displacement amounts ZA, ZC, and defocus amounts DEF1 and DEF2 are expressed by the following formulae (1A) and (1B).

$$L: EPD = ZA: DEF1 \quad \text{Formula (1A)}$$

$$L: EPD = ZC: DEF2 \quad \text{Formula (1B)}$$

When the above formulae (1A) and (1B) are transformed about the defocus amounts DEF1 and DEF2, the following formulae (2A) and (2B) are obtained. That is, the defocus amounts DEF1 and DEF2 can be calculated on the basis of the formulae (2A) and (2B).

$$DEF1 = ZA \cdot EPD/L \quad \text{Formula (2A)}$$

$$DEF2 = ZC \cdot EPD/L \quad \text{Formula (2B)}$$

The baseline length L as the control parameter can be calculated on the basis of the signal output characteristic of the focus detection pixel in accordance with the light receiving angle. For example, centroid points of divided regions that are paired at the pupil position are calculated using a hypothetical image pickup optical system of which the aperture value AP and the exit pupil distance EPD are voluntarily set. A distance between the calculated two centroid points is used as the baseline length L. As mentioned above, when the relationship between the light receiving angle of the focus detection pixel and the output signal intensity in the image pickup apparatus 100 is known, the relationship between the baseline length L and the reference information can be beforehand stored in the baseline-length-information table 116 as a coefficient of an approximate formula or a two-dimensional array.

The reference information includes a focus detection coordinate and optical parameters including the aperture value AP and the exit pupil distance EPD corresponding to the exit pupil position LPO of the image pickup optical system, for example. It should be noted that the baseline-length-information table 116 preferably stores a plurality of relationships between the reference information corresponding to the types of the image pickup optical unit 101 and the baseline length L (the control parameter).

The image pickup apparatus 100 stores the baseline length as the control parameter obtained as mentioned above, calculates a defocus amount on the basis of the baseline length L, the exit pupil distance EPD, and an image displacement amount, and performs a focusing operation. It should be noted that the coefficient (for example, "EPD/L" in the above-mentioned formulae (2A) and (2B)) multiplied to the image displacement amount to calculate the defocus amount may be referred to as a "conversion coefficient K".

The above focusing operation is achievable by focus drive using a stepping motor. In the above focusing operation, it is preferable to use a formula including a constant that calculates the required pulse number (focus driving amount) of the stepping motor on the basis of the calculated defocus amount. That is, the focusing operation is performed according to the focus driving amount calculated on the basis of the defocus amount.

Incidentally, when a configuration that moves the image sensor 104 for image stabilization (sensor-shift image stabilization) is employed, the above-mentioned image displacement amount may vary even though the focus state does not vary. The image displacement amount varies because the baseline length L depends on the incident angle to the focus detection pixel due to the movement of the image sensor 104. More details are described as follows.

The exit pupil of the image pickup optical system that influences the incident angle to the focus detection pixel will be described by referring to FIG. 7A and FIG. 7B. FIG. 7A and FIG. 7B are views showing positional relationships between the image pickup optical unit 101 and an image sensor IS, and incident light paths. FIG. 7A shows a reference state where image blur does not occur, and FIG. 7B shows an image stabilized state where the image blur by an angle $\omega$ is corrected.

In FIG. 7A and FIG. 7B, the image sensor IS is equivalent to the image sensor 104 mentioned above, and an iris diaphragm SP is equivalent to the iris diaphragm 102 mentioned above. An optical axis AX is the optical axis of the image pickup optical unit (image pickup optical system) 101. The exit pupil position LPO and an exit pupil region EPO represent the exit pupil position and exit pupil region of the image pickup optical unit (image pickup optical system) 101, respectively. A central pixel CS located at the center of image sensor IS, a left pixel LS located near the left end of the image sensor IS, and a right pixel RS located near the right end of image sensor IS are displayed in FIG. 7A and FIG. 7B as typical focus detection pixels (representative pixels) for description.

In FIG. 7B. the image blur by the angle $\omega$ is corrected because the image-sensor drive unit 123 moves the image sensor IS in a direction perpendicular to the optical axis AX by ΔX. As shown in FIG. 7B, the incident angle of the light beam that each of the representative pixels LS, CS, and RS receives from the exit pupil region EPO varies before and after the image stabilization.

Figure 8:
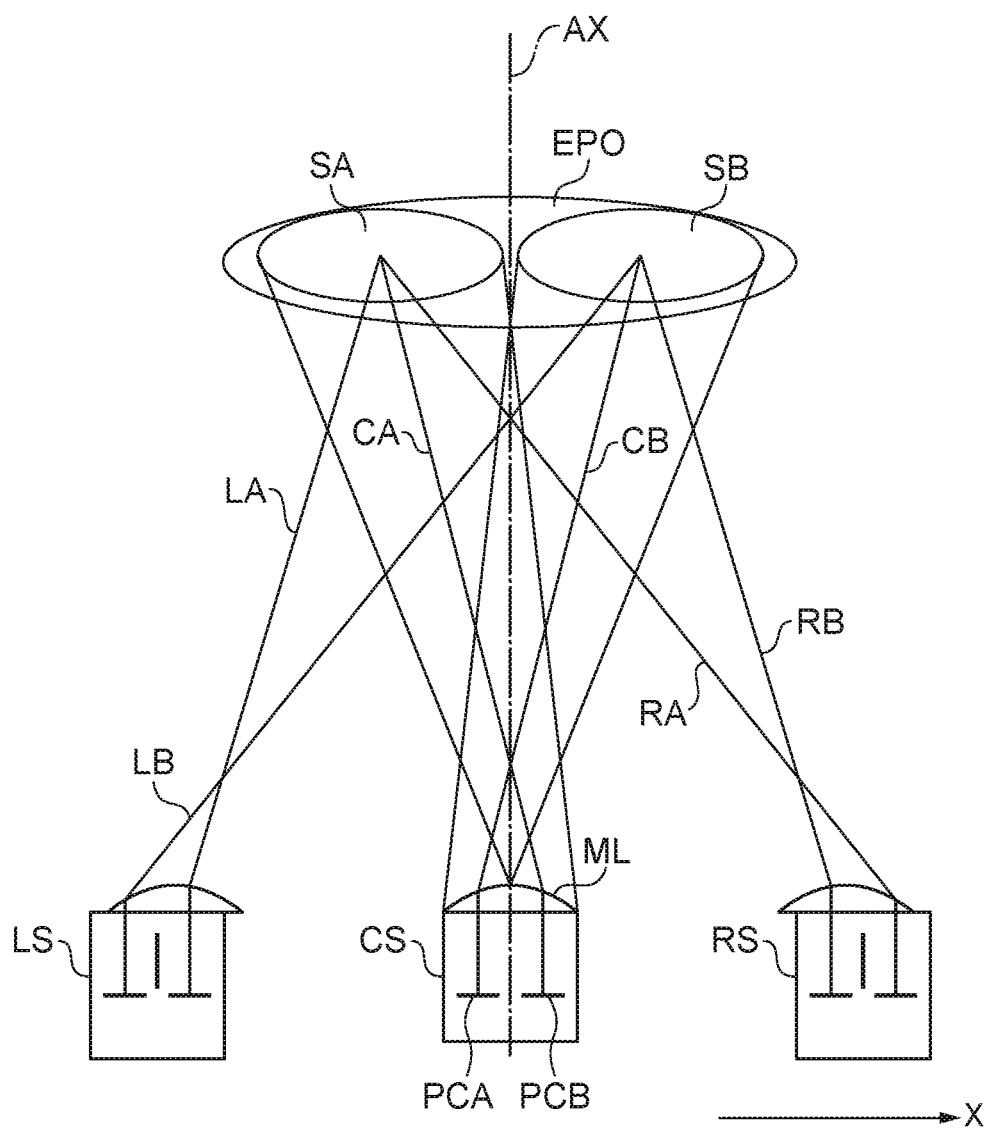
FIG. 8 is an explanatory view showing light receiving conditions in the focus detection pixels in the first embodiment.
Figure 9:
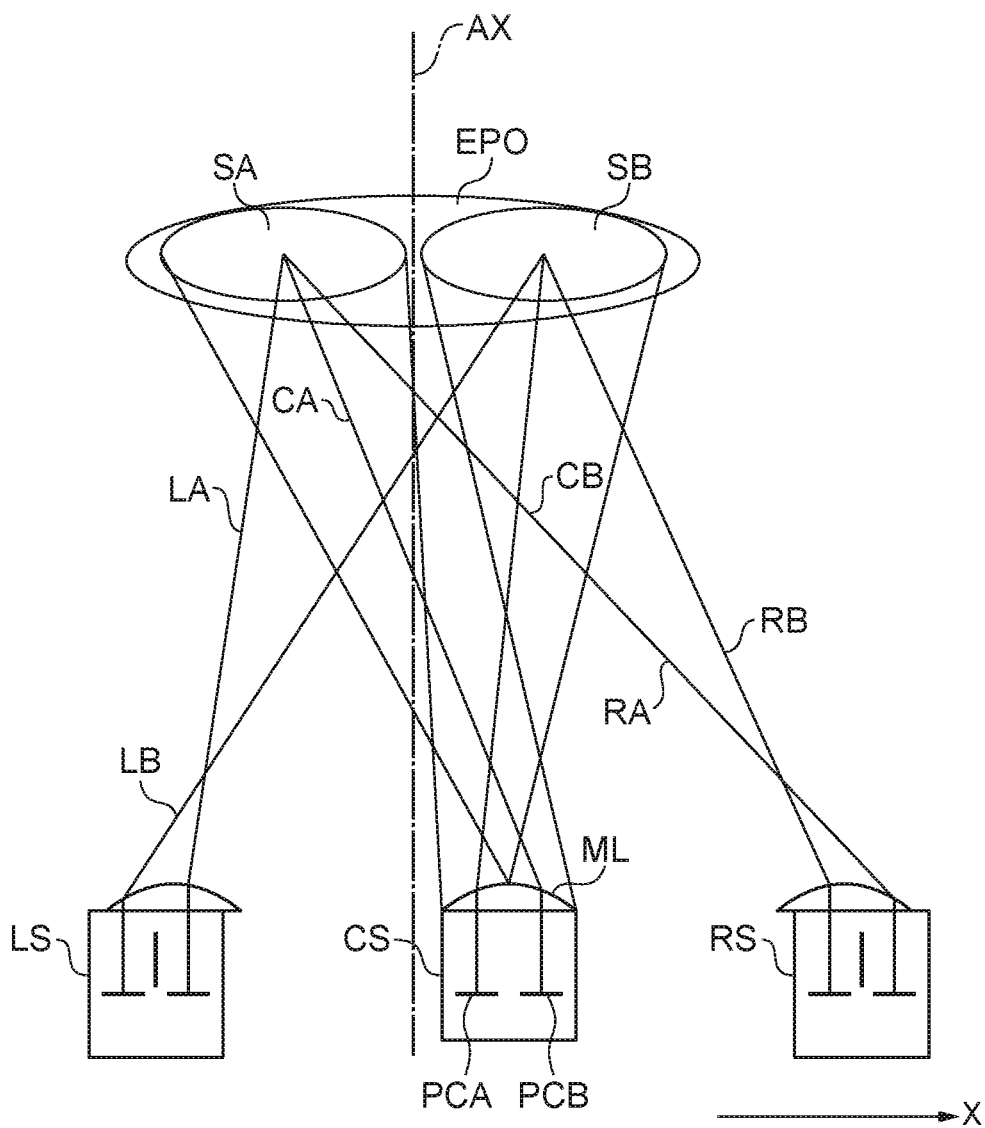
FIG. 9 is an explanatory view showing other light receiving conditions in the focus detection pixels in the first embodiment.

FIG. 8 and FIG. 9 are explanatory views showing light receiving states of the focus detection pixels. FIG. 8 shows the light receiving states in the reference state in FIG. 7A where image blur does not occur, and FIG. 9 shows the light receiving states in the image stabilized state in FIG. 7B where the image blur is corrected. As mentioned above, a plurality of photoelectric conversion parts can be provided per one micro lens in this embodiment.

As shown in the examples in FIG. 8 and FIG. 9, each of the focus detection pixels LS, CS, and RS is provided with a pair of photoelectric conversion parts PCA and PCB that are divided and adjacent in the X-direction. As mentioned below, the image displacement amount is detected on the basis of the correlation signals output from the photoelectric conversion parts PCA and PCB. It should be noted that a pair of the photoelectric conversion parts PCA and PCB may be provided in two different focus detection pixels, respectively.

Regions SA and SB are division regions (pupil division regions) of an entrance pupil that the photoelectric conversion parts PCA and PCB receive, Light rays LA and LB are principal rays that are incident vertically on the photoelectric conversion parts PCA and PCB of the left pixel LS. Similarly, light rays CA and CB are principal rays that are incident vertically on the photoelectric conversion parts PCA and PCB of the central pixel CS, and light rays RA and RB are principal rays that are incident vertically on the photoelectric conversion parts PCA and PCB of the right pixel RS.

When the exit pupil position is given within a finite distance, a microlens ML for each of the right pixel RS and left pixel LS of the image sensor IS eccentrically shifted with respect to a boundary of the photoelectric conversion parts PCA and PCB so as to deflect obliquely incident rays from the pupil division regions SA and SB. Accordingly, a deflection angle of a light ray that is incident on a focus detection pixel, such as the left pixel LS and the right pixel RS, located in a peripheral region of the image sensor IS becomes larger than a deflection angle of a light ray that is incident on a focus detection pixel, such as the central pixel CS, located in a central region. This reduces lowering of the intensity of the light rays received by the photoelectric conversion parts PCA and PCB of a focus detection pixel located in the peripheral region.

In FIG. 9 corresponding to FIG. 7B. the image sensor IS has been moved by ΔX in the X-direction (correlation direction perpendicular to the optical axis AX) in order to stabilize an image (sensor-shift image stabilization). As a result, the incident angles of the light rays LA, LB, CA, CB, RA, and RB that are incident on the photoelectric conversion parts PCA and PCB of the representative pixels LS, CS, and RS vary from the corresponding incident angles (vertical angle) shown in FIG. 8. This is the same about other focus detection pixels that are not illustrated.

Figure 10:
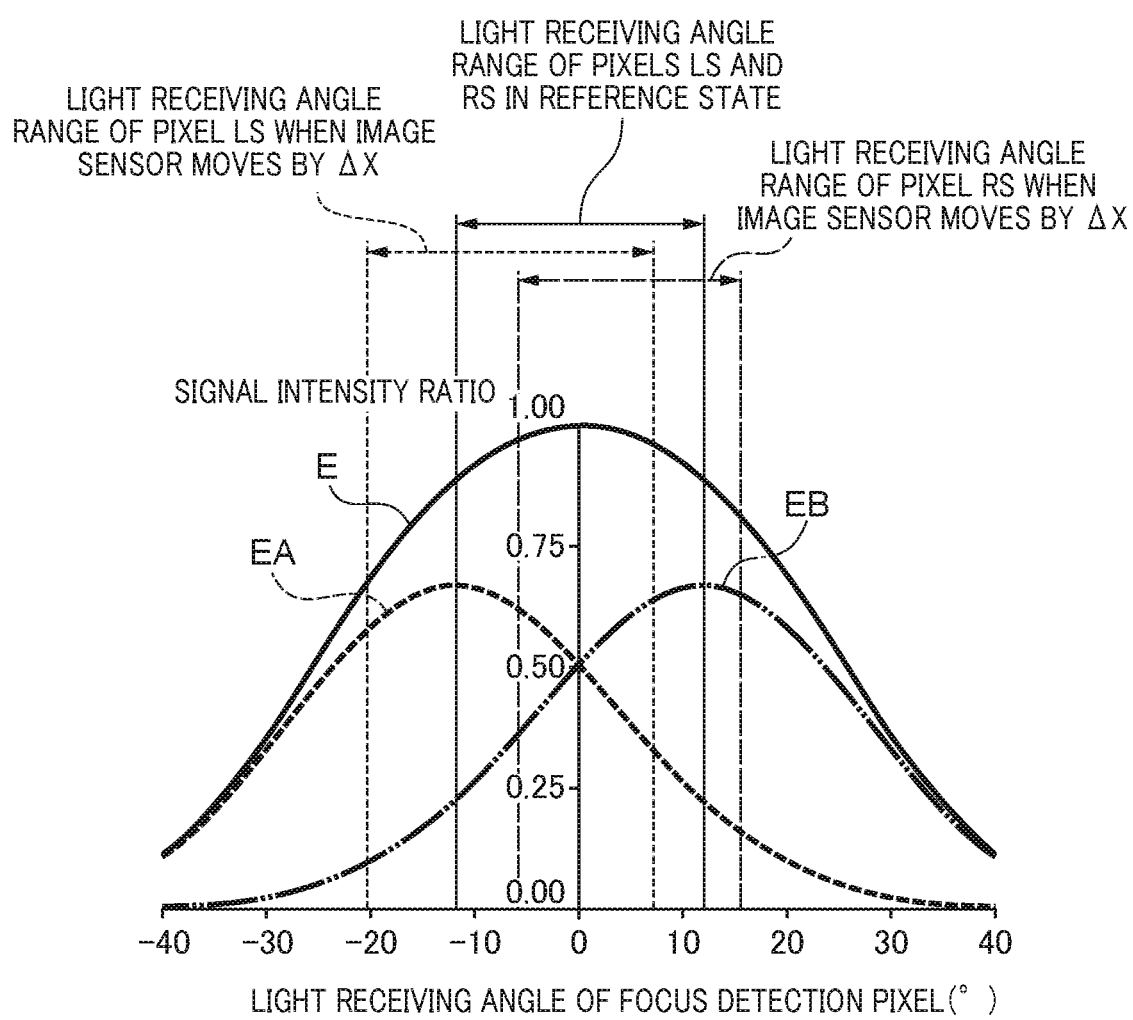
FIG. 10 is a graph showing change of the light receiving angle range corresponding to movements of the image sensor in the first embodiment.

FIG. 10 is a graph showing the pixel pupil intensity distribution as shown in FIG. 5 and shows change of the light receiving angle range corresponding to movement of the image sensor IS. In the same manner as FIG. 5, the signal intensity of the curve EA corresponds to the A-image signal, and the signal intensity of the curve EB corresponds to the B-image signal. As shown in FIG. 10, the left pixel LS and the right pixel RS that are the focus detection pixels output the integration values of the signals within the light receiving angle ranges (light receiving angle ranges in the reference state) that are symmetrical with respect to the angle 0 degrees as the signal intensities in the reference state where image blur does not occur.

In the meantime, when the image sensor IS moves by ΔX in the X-direction as described by referring to FIG. 7B and FIG. 9, the left pixel LS, the right pixel RS, and the exit pupil position LPO also move, which changes the light receiving angle ranges of the left pixel LS and right pixel RS. Specifically, as shown by broken lines in FIG. 10, the light receiving angle range of the right pixel RS is displaced to a plus angle side, and the light receiving angle range of the left pixel LS is displaced to a minus angle side. As mentioned above, when the image sensor IS moves for the image stabilization, the light receiving angle ranges vary, which displaces the integration range for obtaining an image signal. As a result, the distance between the centroid of the A image and the centroid of the B image varies.

Figure 11A:
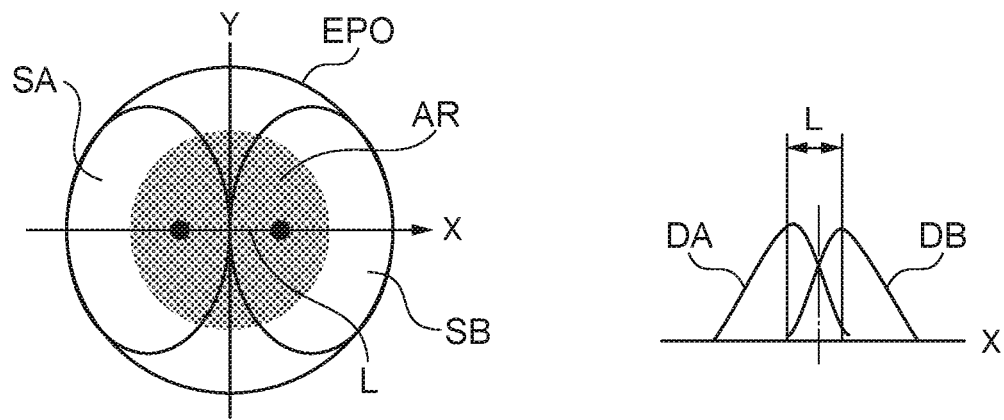
FIG. 11A, FIG. 11B, and FIG. 11C are explanatory views showing changes of signal intensity distribution and an image displacement amount corresponding to movements of the image sensor in the first embodiment.
Figure 11B:
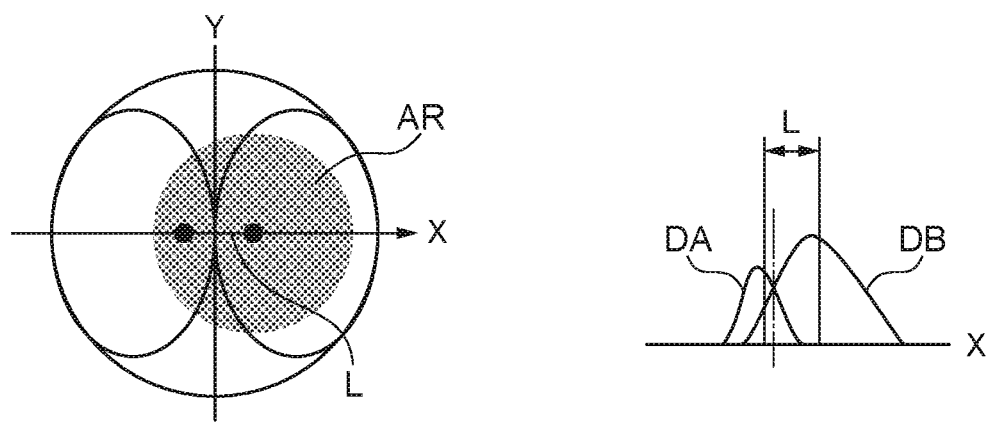

The change of the image displacement amount will be described by referring to FIG. 11A, FIG. 11B, and FIG. 11C. FIG. 11A shows the reference state where image blur does not occur and the image sensor IS is not moved. In FIG. 11A, the respective principal rays are incident on the photoelectric conversion parts PCA and PCB vertically. FIG. 11B shows a state where the incident angles of the respective principal rays vary toward the +X-side (rightward in the drawing) with movement of the image sensor IS due to the image stabilization, FIG. 11C shows a state where the incident angles of the respective principal rays vary toward the −X-side (leftward in the drawing) with movement of the image sensor IS due to the image stabilization.

Figure 11C:
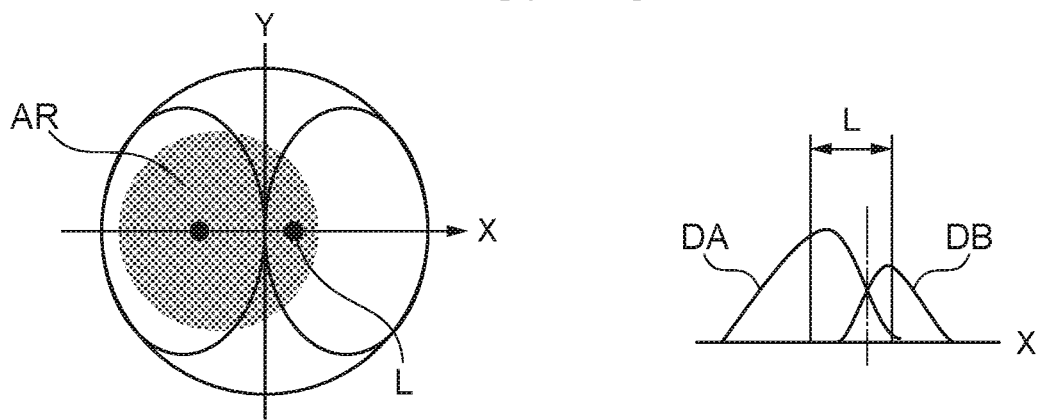

The exit pupil region EPO that is receivable at the exit pupil position LPO shown in FIG. 7A and FIG. 7B and the pupil division regions SA and SB are shown in the left sides in FIG. 11A, FIG. 11B, and FIG. 11C. The exit pupil region EPO of the image pickup optical system can be found on the basis of the aperture value AP and the light beam vignetting condition of the image pickup optical system. The pupil division regions SA and SB are division regions of the exit pupil that the photoelectric conversion parts PCA and PCB receive.

The signal intensity distributions covering the photoelectric conversion parts PCA and PCB in the X-direction are shown in the right sides in FIG. 11A, FIG. 11B, and FIG. 11C. In order to simplify the description, the signal intensity distributions at the image heights of the representative pixels LS, CS, and RS are described in the above-mentioned description. In the meantime, FIG. 11A, FIG. 11B, and FIG. 11C show the distributions of a plurality of pairs of phase difference signals that are obtained from a group A that includes a plurality of photoelectric conversion parts PCA of a plurality of focus detection pixels and a group B that includes a plurality of photoelectric conversion parts PCB of the focus detection pixels.

The pairs of the phase difference signals that are used in the correlation calculation (detection of an image displacement amount) are obtained by scanning the focus detection pixels aligned in the correlation direction (X-direction), and exhibit a defocus image with image spread. The distributions DA and DB in the right side of FIG. 11A, FIG. 11B, and FIG. 11C show the intensity distributions of the signals obtained by scanning the groups A and B, respectively. The image displacement amount (baseline length) L is found in accordance with the above signal intensity distributions.

As shown in FIG. 10, the signal intensity characteristic varies nonlinearly in accordance with the light receiving angle. This is because the integration value of the signal intensity also varies with the shift of the light receiving angle range from the reference state. As a result, as compared with the baseline length L in the reference state in FIG. 11A, the baseline length L in FIG. 11B becomes shorter, and the baseline length L in FIG. 11C becomes longer. The image displacement amount depends on the baseline length L.

As mentioned above, at the time of focus detection, an error occurs in the baseline length L (image displacement amount) resulting from the movement of the image sensor IS even though the defocus state does not vary As described above by referring to FIG. 6, since the defocus amount is calculated using the baseline length, the exit pupil distance, and the image displacement amount, the defocus amount cannot be calculated correctly even if the baseline length information obtained from the baseline-length-information table 116 without considering the movement of the image sensor IS.

As mentioned above, the baseline-length-information table 116 stores the correspondence relationship between the baseline length L as the control parameter and the reference information including the plurality of optical parameters and the focus detection coordinate. For example, the baseline-length-information table 116 stores the pupil position (image-sensor pupil position) of the image sensor IS, the exit pupil position of the image pickup optical system, the aperture value, and the focus detection coordinate (X, Y) in association with the baseline length L. The baseline-length-information obtaining unit (information obtaining unit) 115 searches the baseline-length-information table 116 with the reference information as a key and extracts the baseline length L as the control parameter.

In general, a high calculation processing capability is required in order to calculate the baseline length L using parameters, such as the exit pupil position of the image pickup optical system, the exit pupil diameter thereof, and the pupil intensity distribution depending on the incident angle to the image sensor IS, and to detect a focus at high speed. In this embodiment, the required calculation amount is reduced by obtaining the baseline length L by searching the baseline-length-information table 116.

As described hereinafter, the reference information used to obtain the baseline length L will be corrected in order to correct the change of the control parameter (baseline length) due to the movement of the image sensor IS.

The image-sensor pupil position will be described first. As described by referring to FIG. 8 and FIG. 9, the microlenses ML for each of the right pixel RS and left pixel LS of the image sensor IS is eccentrically shifted with respect to the boundary of the photoelectric conversion parts PCA and PCB so as to deflect obliquely incident rays from the pupil division regions SA and SB. Accordingly, a deflection angle of a light ray that is incident on a focus detection pixel, such as the left pixel LS and the right pixel RS. located in a peripheral region of the image sensor IS becomes larger than a deflection angle of a light ray that is incident on a focus detection pixel, such as the central pixel CS, located in a central region.

Figure 12A:
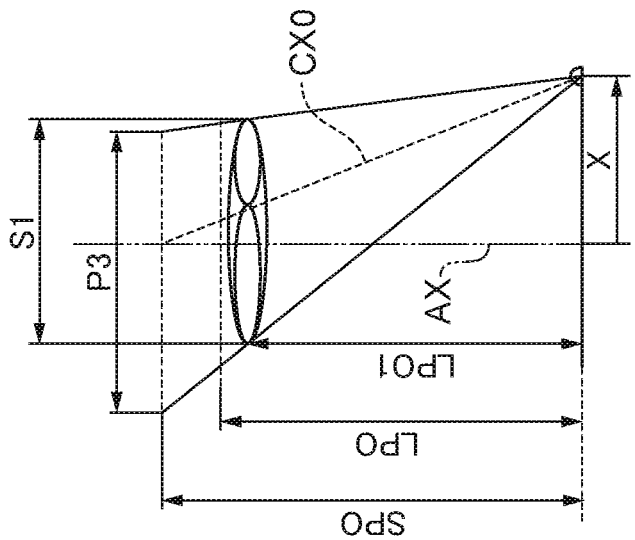
FIG. 12A, FIG. 12B, and FIG. 12C are explanatory views showing a correction method for the reference information in the first embodiment.
Figure 12B:
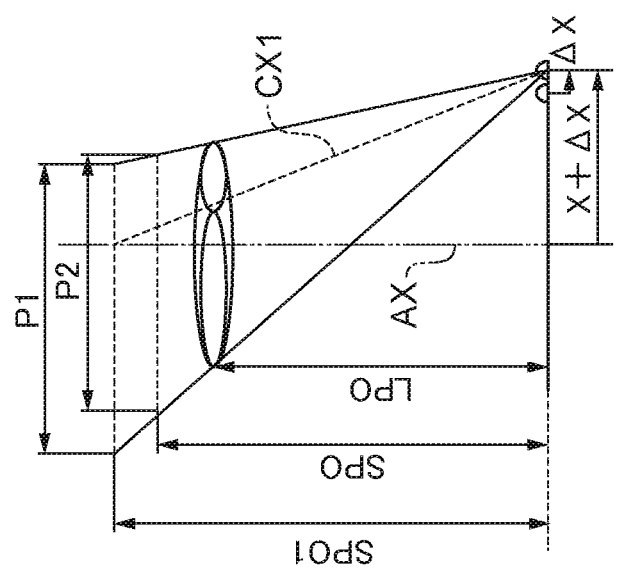
Figure 12C:
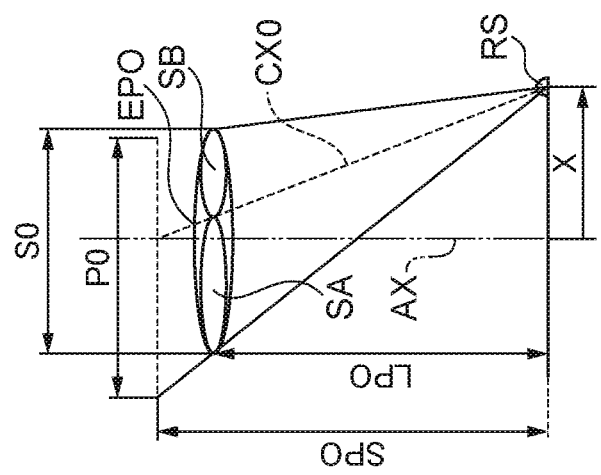

A position of the entrance pupil of the image sensor at which an incident angle of a light ray from the predetermined exit pupil position LPO is optimized by eccentrically shifting the microlens ML is called the image-sensor pupil position SPO (see FIG. 12A, FIG. 12B, and FIG. 12C). The image-sensor pupil position SPO is determined in accordance with the image pickup optical system (image pickup optical unit 101). It is preferable that the image-sensor pupil position SPO be stored in the memory of the image pickup apparatus 100 and be obtained and corrected by the reference-information correction unit 119. When the image pickup optical unit 101 is exchangeable, it is preferable to set the image-sensor pupil position SPO so as to match the typical exit pupil position LPO covering a plurality of image pickup optical units.

FIG. 12A, FIG. 12B, and FIG. 12C are explanatory views showing a correction method for the reference information in this embodiment. In the correction method described hereinafter, the optical parameters (the image-sensor pupil position SPO etc.) are corrected on the basis of the moving amount of the image sensor IS, etc. before obtaining the baseline length L on the basis of the optical parameters and the focus detection coordinate. FIG. 12A, FIG. 12B, and FIG. 12C show the image-sensor pupil positions SPO and SPO1, the exit pupil position LPO and LPO2 of the image pickup optical system, and an incidence state of a light ray to the focus detection pixel (the right pixel RS) located at the coordinate X. Although the following description takes up the movement in the X-direction only, it is also applicable to the movement in the Y-direction perpendicular to the X-direction. Accordingly, the correction method of this embodiment described hereinafter is applicable to the configuration in which the image sensor IS moves two-dimensionally.

FIG. 12A shows the reference state before the sensor-shift image stabilization (image blur correction) is performed, A light ray within a region P0 is regulated to the predetermined angle range by the exit pupil diameter S0 of the image pickup optical system and is incident on the focus detection pixel (right pixel RS) according to the pupil-intensity-distribution characteristic mentioned above. In this example, since the image-sensor pupil position SPO is apart from the exit pupil position LPO, the angle range of the incident ray to the right pixel RS is regulated. As a result, since the pupil-intensity-distribution characteristic is asymmetrical in the X-direction (left-and-right direction in the drawing), an incident ray CX0 that is equivalent to the center position of the pupil-intensity-distribution characteristic is also shifted from the center in the X-direction.

FIG. 12B is equivalent to the state where the image sensor IS is moved by ΔX in the X-direction by the sensor-shift image stabilization. As mentioned above, the pupil-intensity-distribution characteristic of the focus detection pixel (right pixel RS) is determined in accordance with the positional relationship between the microlens in a pixel and the photoelectric conversion part PC, and the movement of the image sensor IS has nothing to do with it. Accordingly, the angle of the incident ray CX0 at the center position of the pupil-intensity-distribution characteristic shown in FIG. 12A does not vary in FIG. 12B. Accordingly, an incident ray CX1 that is equivalent to the center position of the pupil-intensity-distribution characteristic after moving the image sensor IS by ΔX in the X-direction intersects the optical axis AX at a position SPO1 in FIG. 12B.

In the state shown in FIG. 12B, the use of the image-sensor pupil position SPO as the reference information is equivalent to obtaining the baseline length L on the basis of the pupil-intensity-distribution characteristic corresponding to a region P2. However, the image-sensor pupil position SPO does not correspond to the intersection of the optical axis AX and the incident ray CX1 that is equivalent to the center position of the pupil-intensity-distribution characteristic, as mentioned above. Accordingly, in this example, when the image sensor IS is moved by ΔX, the image-sensor pupil position SPO is corrected to the image-sensor pupil position SPO1 corresponding to the intersection of the optical axis AX and the incident ray CX1 equivalent to the center position of the pupil-intensity-distribution characteristic.

The above correction avoids changing the center position of the pupil-intensity-distribution characteristic with respect to the focus detection pixel at the coordinate position to detect a focus before and after the movement of the image sensor IS. As a result, the pupil-intensity-distribution characteristic on the image-sensor pupil position SPO1 seen from the right pixel RS after the movement of the image sensor IS becomes equivalent to the pupil-intensity-distribution characteristic in the reference state before the movement.

Since the pupil intensity distribution is a ratio of the signal intensity to the incident angle to the image sensor IS, angle information is represented by the image-sensor pupil position and the coordinate in a pupil radial direction. Moreover, since a region P1 corresponding to the image-sensor pupil position SPO1 after the correction is similar to the region P0 in FIG. 12A, the coordinate in the pupil radial direction corresponding to the image-sensor pupil position is found by multiplying the change amount of the distance to the image sensor IS proportionally.

FIG. 13A is a flowchart showing an outline of a correction process for the image-sensor pupil position SPO in FIG. 12B mentioned above. First, the reference-information correction unit 119 obtains the exit pupil position and the aperture value (exit pupil diameter) of the image pickup optical system and the coordinate of the focus detection pixel as the reference information (step S13A1) and obtains the moving amount of the image sensor IS (step S13A2). Next, the reference-information correction unit 119 corrects the coordinate of the focus detection pixel on the basis of the moving amount of the image sensor IS and corrects the image-sensor pupil position SPO as described above (step S13A3). Then, the baseline-length-information obtaining unit 115 searches the baseline-length-information table 116 using the reference information obtained by the above-mentioned step (step S13A4) and obtains the baseline length L (step S13A5).

According to the above configuration, the baseline length L (control parameter) corresponding to the moving amount of the image sensor IS (that is, the error is corrected) is obtained without providing the baseline-length-information table 116 for every moving amount of the image sensor IS. Accordingly, even in the time of the image stabilization, the defocus amount for the focus detection is calculated with high accuracy at high speed by the simple configuration. As a result, highly accurate and high-speed focusing operation is achievable.

Next, another correction method for the reference information will be described by referring to FIG. 12C and FIG. 13B. This correction method applies a scaling process to the values obtained by the above-mentioned correction method on the basis of the change amount of the coordinate position to detect a focus. A change amount (change rate) M used for the scaling process is found by the following formula (3A) that uses the coordinate X of the focus detection pixel and the moving amount $\Delta X$.

$$M = X/(X+\Delta X) \qquad \text{Formula (3A)}$$

The above scaling process returns the image-sensor pupil position SPO1 after the correction to the original image-sensor pupil position SPO and returns the X coordinate of the focus detection pixel after the correction to the original X coordinate. In the meantime, the exit pupil position LPO of the image pickup optical system is changed to an exit pupil position LPO1 after the correction found by the following formula (3B).

$$LPO1 = M \cdot LPO \qquad \text{Formula (3B)}$$

Since the exit pupil diameter S0 of the image pickup optical system shown in FIG. 12A is multiplied to an exit pupil diameter S1 shown in FIG. 12C by the above scaling process, it is suitable to correct the aperture value AP. Since the exit pupil of the image pickup optical system is a virtual image of the image pickup optical system, a corrected aperture value AP1 is expressed by the following formula (3C) based on a general optical law (depth magnification=square of lateral magnification).

$$AP1:S1 = AP:S0 \cdot M^2 \qquad \text{Formula (3C)}$$

FIG. 13B is a flowchart showing an outline of a correction process for the image-sensor pupil position LPO and the aperture value AP in FIG. 12B and FIG. 12C mentioned above. First, the reference-information correction unit 119 obtains the exit pupil position and the aperture value (exit pupil diameter) of the image pickup optical system and the coordinate of the focus detection pixel as the reference information (step S13B1) and obtains the moving amount of the image sensor IS (step S13B2). Next, the reference-information correction unit 119 corrects the exit pupil position LPO of the image pickup optical system and the aperture value AP by using the change rate M as the change amount (step S13B3).

The baseline-length-information obtaining unit 115 searches the baseline-length-information table 116 using the reference information (the exit pupil position LPO1 and the aperture value AP1 after the correction) obtained by the above-mentioned step (step S13B4) and obtains the baseline length L (step S13B5).

According to the above correction method, the baseline length L corresponding to the moving amount of the image sensor IS is obtained as with the above-mentioned correction method. Accordingly, even in the time of the image stabilization, the defocus amount for the focus detection is calculated with high accuracy at high speed by the simple configuration. As a result, highly accurate and high-speed focusing operation is achievable. In addition, since the image-sensor pupil position SPO does not vary before and after the correction, there is no need to add an array corresponding to the change of the image-sensor pupil position to the baseline-length-information table 116. Accordingly, the volume of the baseline-length-information table 116 can be reduced.

Next, still another correction method for the reference information will be described by referring to FIG. 13C. This correction method corrects the exit pupil position LPO of the image pickup optical system as with the process in FIG. 1313, searches the baseline-length-information table 116, and obtain the baseline length L (steps S13C1 through S13C5) without correcting the aperture value AP. The baseline-length-information obtaining unit 115 corrects the baseline length L (step S13C6) obtained without reflecting correction of the aperture value AP as mentioned above on the basis of the following formulas (4) and obtains the baseline length L1 after the correction (step S13C7).

$$L1 = L \cdot M^2 \qquad \text{Formula (4)}$$

According to the above correction method, the baseline length L corresponding to the moving amount of the image sensor IS is obtained as with the former correction method. Since this method avoids correcting the aperture value AP that may be structurally difficult to correct, the baseline length L is obtained with sufficient accuracy by a simpler configuration. Moreover, even in the time of the image stabilization, the defocus amount for the focus detection is calculated with high accuracy at high speed by the simple configuration as with the former method. As a result, highly accurate and high-speed focusing operation is achievable.

Figure 14:
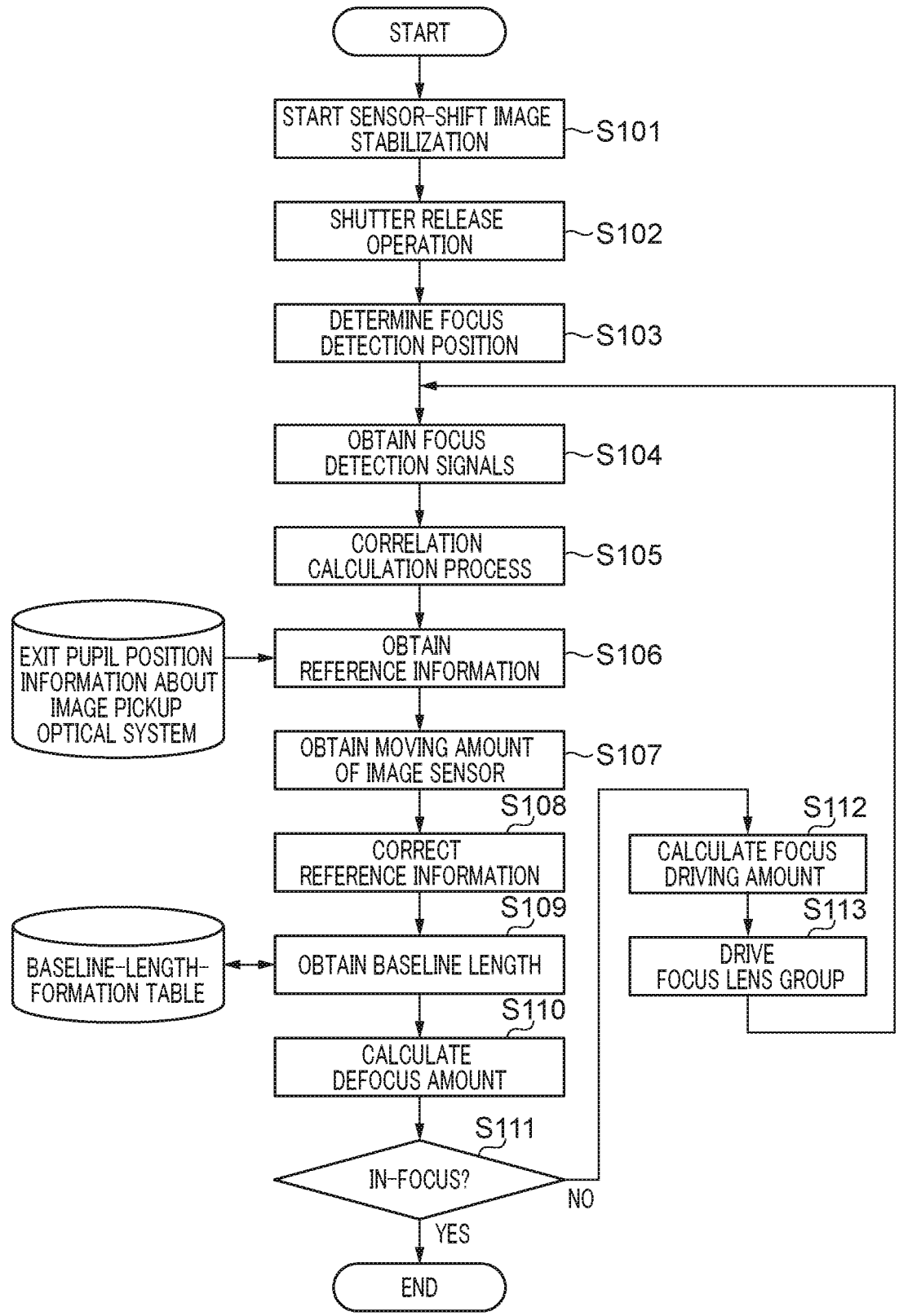
FIG. 14 is a flowchart showing a process from focus detection including the correction process in the first embodiment to an focusing operation.

FIG. 14 is a flowchart showing a process from focus detection including the correction process in the first embodiment to an focusing operation.

A user turns the power of the image pickup apparatus 100 ON and starts the sensor-shift image stabilization (image blur correction) in step S101. When the image pickup optical unit 101 is a zoom lens, focal length information shall have been already obtained.

When the user performs a shutter release operation in step S102, the focus-detection-coordinate determination unit 111 determines a focus detection position (XY coordinate in the image sensor 104) in step S103. It should be noted that a trigger operation before a main image capturing or the main image capturing may be performed in response to the shutter release operation in the step S102.

When the focus detection position is determined, the focus-detection-signal extraction unit 112 obtains (extracts) focus detection signals in step S104. In the next step S105, the correlation calculation unit 113 performs a correlation operation process using correlation signals that are the extracted focus detection signals to detect an image displacement amount.

In step S106, the reference-information correction unit 119 obtains the above-mentioned optical parameters (focal length, a focus detection coordinate, an aperture value, an exit pupil position, etc) as the reference information. The step S106 corresponds to the above-mentioned steps S13A1, S13B1, and S13C1. The exit pupil position of the image pickup optical system can be obtained on the basis of the focal length, the focus detection coordinate of the image sensor, and the aperture value. It should be noted that the current focus lens position may be used to improve the accuracy of the exit pupil position.

In step S107, the reference information correction unit 119 obtains the moving amount of the image sensor 104 that is detected by the moving amount detection unit 122. The step S107 corresponds to the above-mentioned steps S13A2, S13B2, and S1302. In step S108, the reference-information correction unit 119 corrects the reference information obtained in the above-mentioned steps. The step S108 corresponds to the above-mentioned steps S13A3, S13B3, and S13C3.

In step S109, the baseline-length-information obtaining unit 115 searches the baseline-length-information table 116 with the corrected reference information and obtains the baseline length L as the control parameter. The step S109 corresponds to the above-mentioned steps S13A4, S13B4, and S13C4, and the steps S13A5, S13B5, and S13C5. It should be noted that the baseline-length-information obtaining unit 115 may correct the baseline length L by the above-mentioned steps S13C6 and S13C7.

In step S110, the focus-driving-amount calculation unit (focus controller) 114 calculates a defocus amount using the image displacement amount and the baseline length information obtained in the above-mentioned steps. It should be noted that the calculation of the defocus amount in the step S110 is equivalent to multiplying the conversion coefficient K to the image displacement amount. In step S111, the controller 130 performs focus determination by comparing an allowable focus range set up on the basis of the defocus amount with the calculated defocus amount.

When it is an in-focus state (YES in the step S111), the controller 130 finishes the above-mentioned focus detecting operation, and performs the following operations (image capturing etc.). In the meantime, when it is not an in-focus state (NO in the step S111), the focus-driving-amount calculation unit 114 calculates a focus driving amount (step S112), and the focus drive unit 117 drives the focus lens group 103 (step S113), Then, the controller 130 returns the process to the step S104 and repeats the above-mentioned process until determining that it is an in-focus state in the step S111.

According to the above-mentioned configuration, the error of the control parameter caused by the movement of the image sensor 104 due to the image stabilization is corrected by the simple configuration in the image pickup apparatus 100 that detects a focus by the image plane phase difference detection method. Accordingly, even in the time of the image stabilization, the defocus amount for the focus detection is calculated with high accuracy at high speed by the simple configuration. As a result, highly accurate and high-speed focusing operation is achievable.

Next, a second embodiment of the present invention will be described. In the first embodiment, the optical parameters like the pupil position information (the image-sensor pupil position SPO, pupil position LPO of the image pickup optical system) are corrected in order to correct the error of the control parameter (the baseline length L) that occurs resulting from the image stabilization. The above-mentioned correction achieves the results equivalent to correcting the control parameter (the baseline length L as a component used to calculates the conversion coefficient K) used to calculate the defocus amount.

In the second embodiment, a defocus amount is calculated by correcting the conversion coefficient K and a shading correction coefficient SC as described below in detail. The conversion coefficient K and the shading correction coefficient SC are preferably corrected by an information obtaining unit equivalent to the baseline-length-information obtaining unit 115 of the first embodiment prior to calculation (obtaining) of the defocus amount in the step S110. It should be noted that a reference numeral referred in the above description is diverted to a component of which an effect and a function are equivalent to the component in the first embodiment and its description is omitted suitably in the second embodiment.

As mentioned above in the first embodiment, the conversion coefficient K used for finding a defocus amount is calculated according to the following formulas (5) using the exit pupil distance EPD corresponding to the exit pupil position LPO and the baseline length L. The baseline length L depends on a shape (frame vignetting shape) of the diaphragm frame projected on a pupil surface.

$$K = EPD/L \quad \text{Formula (5)}$$

FIG. 15 is an explanatory view showing pixel intensity distributions and projection positions of the diaphragm frame two-dimensionally. The projected diaphragm frame is changed by vignetting shapes of a front frame and a rear frame of a lens. As shown in FIG. 15, a first pupil intensity distribution of the photoelectric conversion part PCA differs from a second pupil intensity distribution of the photoelectric conversion part PCB. In the meantime, the diaphragm frame is projected on the same position. The first pupil intensity distribution corresponds to the above-mentioned A image, and the second pupil intensity distribution corresponds to the above-mentioned B image. The baseline length L is calculated as a distance (interval) between the centroid point of the intensity distribution included in the diaphragm frame projected on the first pupil intensity distribution and the centroid point of the intensity distribution included by the diaphragm frame projected on the second pupil intensity distribution.

Figures 16, 17:
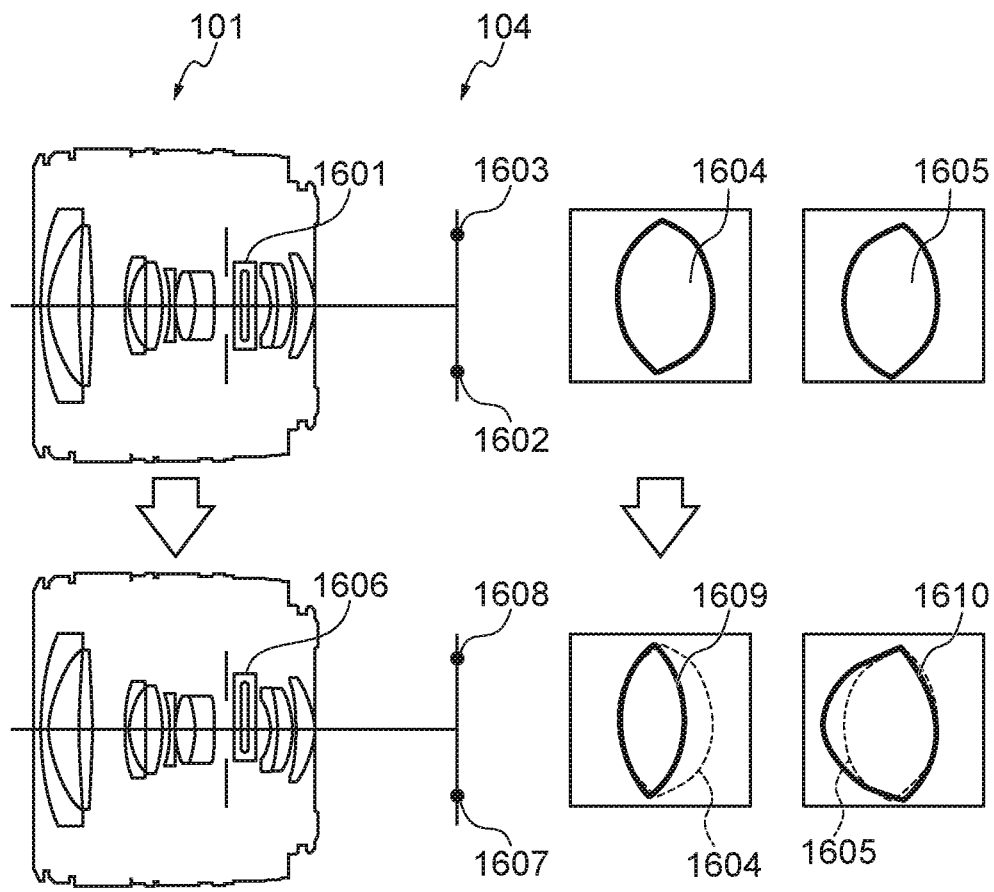
FIG. 16 is an explanatory view showing relationships between a position of an image pickup optical system and a vignetting shape in the second embodiment.
FIG. 17 is a view showing a relationship between a moving amount of the correction optical system and a change rate of area of the frame vignetting shape in the second embodiment.

When the aperture value is set so as not to be affected by lens frames, the projected diaphragm frame shows an approximately perfect circle because the diaphragm frame itself is projected. In the meantime, since lens frames (a front frame and a rear frame) enter inside the diaphragm frame in some image height or when some type of an interchangeable lens is used, the projected diaphragm frame shows an approximately ellipse as shown in FIG. 15. Furthermore, when an image stabilization mechanism of a lens shift method is employed, image blur is corrected by moving a correction optical system in the image pickup optical unit 101 in a direction perpendicular to the optical axis. In such a case, the shape of the projected diaphragm frame is changed also when the correction optical system moves relatively at the time of the image stabilization. The correction optical system is moved by a relative moving unit (not shown FIG. 16 is an explanatory view showing relationships between a position of the image pickup optical system and a vignetting shape of the projected diaphragm frame, At a position 1601, the center of the correction optical system is coincident with an optical axis of the image pickup optical unit 101. In the state where the correction optical system is not shifted, frame vignetting shapes 1604 and 1605 at image height positions 1602 and 1603 on the image sensor 104 show approximately ellipses (lemon shapes) resulting from the vignetting by the lens frames. It should be noted that the frame vignetting shapes 1604 and 1605 are rotationally symmetrical mutually. A frame vignetting shape in a central image height without the vignetting by the lens frames shows an approximately perfect circle.

In the meantime, at a position 1606, the center of the correction optical system in the image pickup optical unit 101 is shifted from the optical axis for the image stabilization. In the state where the correction optical system is shifted, frame vignetting shapes (solid lines) 1609 and 1610 at image height positions 1607 and 1608 on the image sensor 104 are deformed asymmetrically as compared with the frame vignetting shapes (broken lines) 1604 and 1605 in the state where the correction optical system is not shifted.

As mentioned above, the shape and size of the frame vignetting shape (projected diaphragm frame) depend on the image height position and the relative position of the correction optical system (due to the image stabilization) in the image pickup optical unit 101. Since the pupil intensity distribution included in the frame vignetting shape varies as a result, the baseline length L varies and the conversion coefficient K varies consequently. Accordingly, the defocus amount for focus detection can be calculated with more sufficient accuracy by correcting the conversion coefficient K according to the frame vignetting shape. Hereinafter, the correction method for the conversion coefficient K will be specifically exemplified, A first correction method will be described. The first method corrects the conversion coefficient K in accordance with the relative position between the correction optical system in the image pickup optical unit 101 and the image sensor 104.

The conversion coefficient K depends on the relative position between the correction optical system in the image pickup optical unit 101 and the image height. For example, when the correction optical system moves rightwardly in the lens groups, since the frame vignetting shape in a right image height is larger than that in a case where the correction optical system is located in the center of the image pickup optical unit 101, the conversion coefficient K becomes small.

In the meantime, when the correction optical system moves rightwardly in the lens groups, since the frame vignetting shape in a left image height is smaller than that in the case where the correction optical system is located in the center of the image pickup optical unit, the conversion coefficient K becomes small. As mentioned above, the conversion coefficient K varies as the correction optical system in the image pickup optical unit 101 shifts.

FIG. 17 is an area change rate table showing a relationship between a moving amount of the correction optical system and a change rate of area of the frame vignetting shape. The change rate of area is calculated from a moving amount of the correction optical system and a relative angle between a moving direction of the correction optical system and a direction from the center of the image sensor toward the image height position. In a case where the relative angle equals 0 degrees, when the correction optical system moves rightwardly, the area of the frame vignetting shape in the right image height increases in proportion to the moving amount of the correction optical system.

Accordingly, when the relative area of the frame vignetting shape in the case a correction optical system is located in the center shall be "1", the relative area of the frame vignetting shape becomes larger than 1 as the moving amount of the correction optical system increases. In a case where the relative angle equals 180 degrees, when the correction optical system moves rightwardly, the area of the frame vignetting shape in the left image height decreases in proportion to the moving amount of the correction optical system. Accordingly, when the relative area of the frame vignetting shape in the case a correction optical system is located in the center shall be "1", the relative area of the frame vignetting shape becomes smaller than 1 as the moving amount of the correction optical system increases.

As shown in FIG. 15, the pupil intensity distributions in this embodiment are divided in the lateral direction (left-and-right direction, horizontal direction). Accordingly, even if the area of the frame vignetting shape varies in the vertical direction perpendicular to the pupil division direction, the influence on the conversion coefficient K is small. Accordingly, the first method changes the conversion coefficient K on the basis of the moving amount and the relative angle only in the pupil division direction. It should be noted that more highly accurate control or control in a configuration having two-dimensional pupil division directions may be achieved by using additional parameters (for example, the moving amount and the relative angle in the vertical direction).

The information obtaining unit calculates the area of the frame vignetting shape by searching the area change rate table in FIG. 17 that is stored in the memory of the image pickup apparatus 100 with the moving amount and the relative angle. Then, the information obtaining unit calculates the conversion coefficient K from the pupil intensity distribution on the basis of the amount of change of the calculated area (that is, the conversion coefficient K is corrected). It should be noted that the conversion coefficient K is preferably calculated by the method based on of an effective aperture value as disclosed in Japanese Laid-Open Patent Publication (Kokai) No. 2015-11283 (JP 2015-11283A), for example.

As mentioned above, the conversion coefficient K is calculated on the basis of the frame vignetting shape that is corrected in accordance with the moving amount of the correction optical system. Accordingly, the use of the conversion coefficient K after correction enables the calculation of the defocus amount with high accuracy at high speed by the simple configuration even in the time of the image stabilization.

Next, a second correction method will be described. The first correction method corrects the conversion coefficient K on the basis of the area change of the frame vignetting shape according to the moving amount of the correction optical system and the relative angle. The second correction method corrects the conversion coefficient K on the basis of shape information that shows shape change of the frame vignetting shape.

Figure 18:
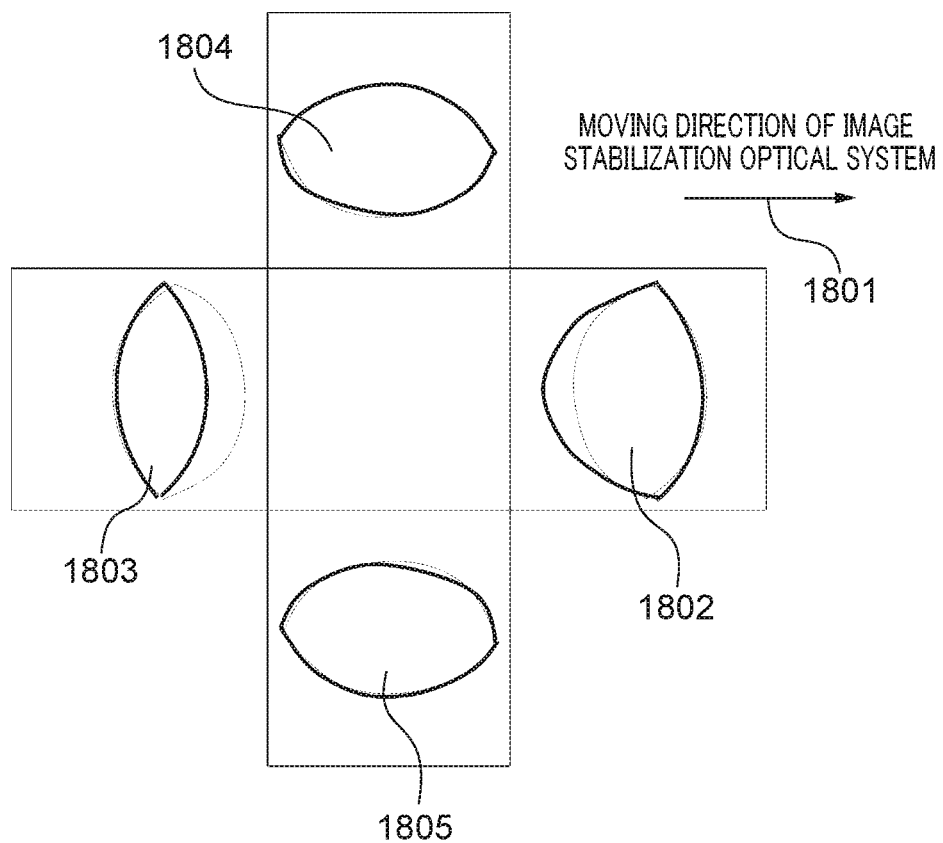
FIG. 18 is an explanatory view showing frame vignetting shapes corresponding to shape information in the second embodiment.

FIG. 18 is an explanatory view showing frame vignetting shapes corresponding to the shape information. FIG. 18 shows frame vignetting shapes 1802. through 1805 at four image height positions (upper, lower, left, and right positions) in a case where the correction optical system in the image pickup optical unit 101 moves rightwardly (a direction indicated by an arrow 1801).

The frame vignetting shapes are the same in the four image height positions in the case where the correction optical system is located in the center. When the correction optical system moves, the frame vignetting shapes in the image height positions exhibit different variations mutually. The frame vignetting shape 1802 corresponds to the frame vignetting shape in the right image height in the state where the correction optical system moves rightwardly. Similarly, the frame vignetting shapes 1803, 1804, and 1805 respectively correspond to the frame vignetting shapes in the left image height, the upper image height, and the lower image height in the state where the correction optical system moves rightwardly.

The memory of the image pickup apparatus 100 stores the frame vignetting shape corresponding to the moving direction of the correction optical system and the relative image height as the shape information. The information obtaining unit corrects the conversion coefficient K on the basis of the shape information in the memory and the pupil intensity distribution.

Figure 19:
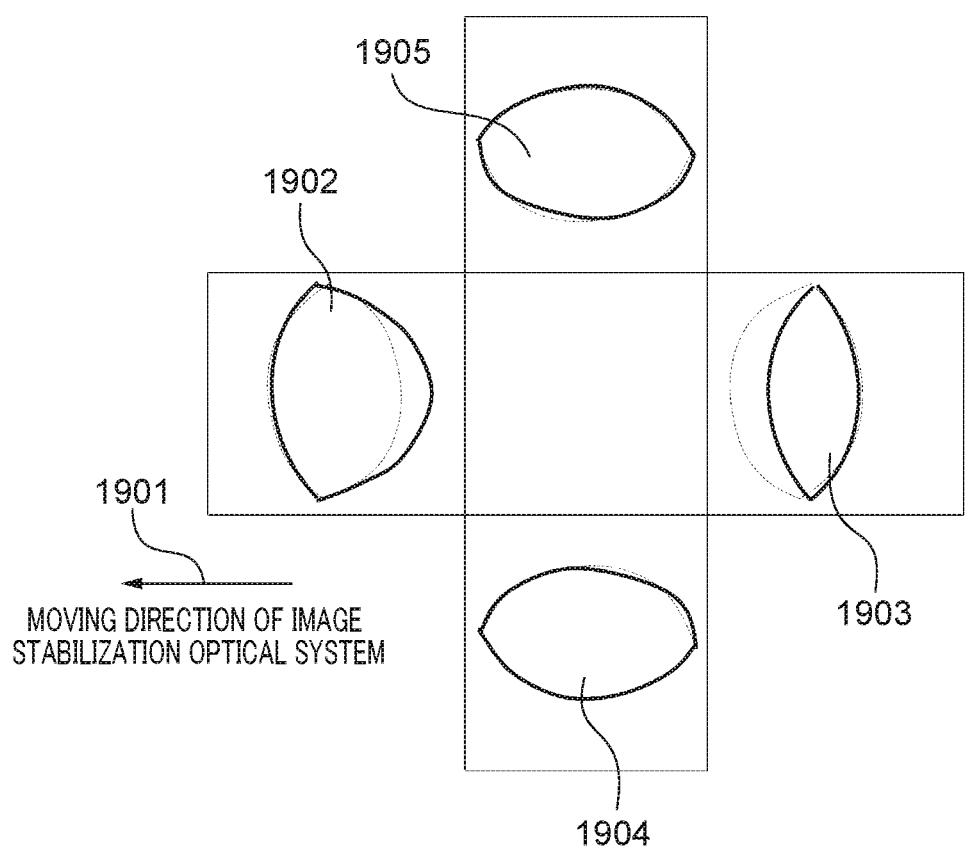
FIG. 19 is an explanatory view showing frame vignetting shapes corresponding to another shape information in the second embodiment.
Figure 20:
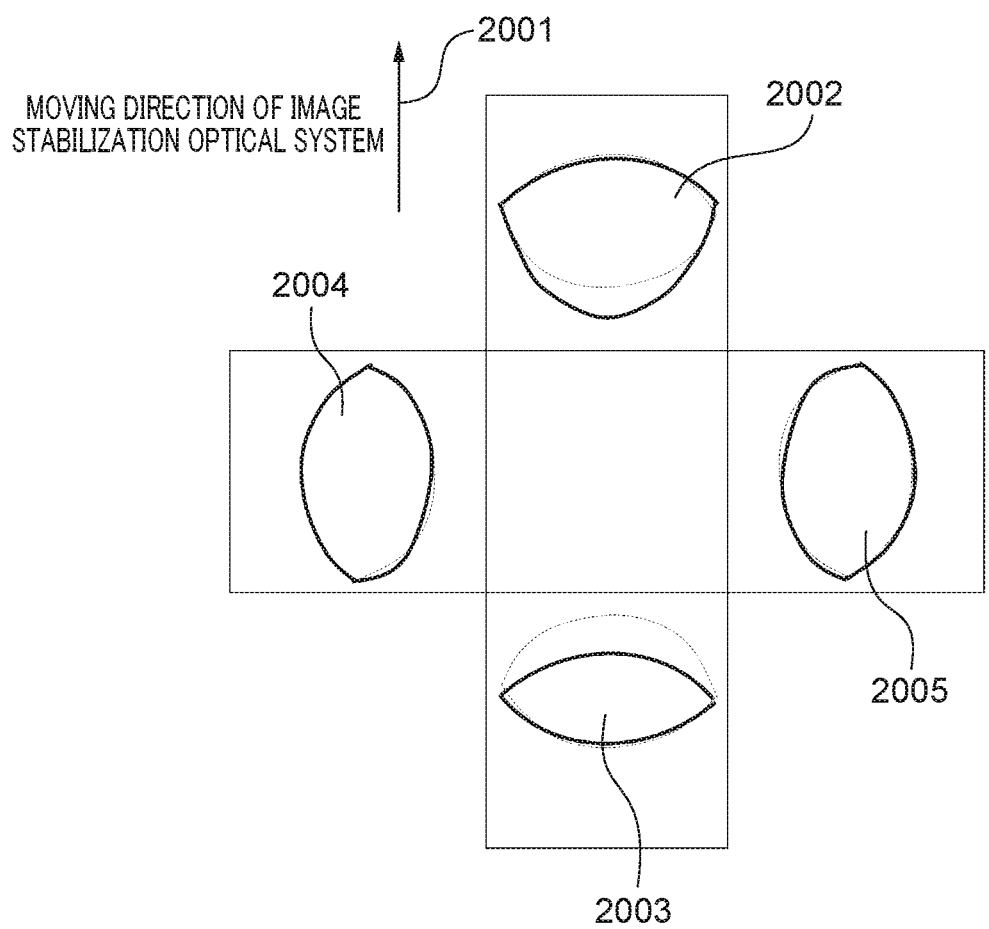
FIG. 20 is an explanatory view showing frame vignetting shapes corresponding to still another shape information in the second embodiment.

FIG. 19 shows an arrangement that rotates the shape information in FIG. 18 by 180 degrees. FIG. 20 shows an arrangement that rotates the shape information in FIG. 18 by 90 degrees counterclockwise. The information obtaining unit may correct the conversion coefficient K after rotating the shape information shown in FIG. 18 or may correct the conversion coefficient K using the shape information corresponding to each rotation angle stored in the memory of the image pickup apparatus 100.

When the correction optical system moves upwardly (a direction indicated by an arrow 2001) as shown in FIG. 20, the frame vignetting shapes 2004 and 2005 in the pupil division direction (the left-and-right direction in FIG. 20) of the pupil intensity distribution do not vary mostly. That is, when the correction optical system moves in the direction (upward or downward) perpendicular to the pupil division direction, change of the conversion coefficient K is small and the influence on the focus detection performance is also small.

As mentioned above, the conversion coefficient K is calculated on the basis of the shape information showing the frame vignetting shape corresponding to the moving direction of the correction optical system and the relative image height. Accordingly, the use of the conversion coefficient K after correction enables the calculation of the defocus amount with high accuracy at high speed by the simple configuration even in the time of the image stabilization.

In the above-mentioned configuration, the memory of the image pickup apparatus 100 stores the shape information equivalent to the frame vignetting shapes of four different image heights that vary by 90 degrees mutually. Furthermore, frame vignetting shapes of eight or sixteen different image heights may be stored in the memory within a permissible range of memory capacity.

According to the above configuration, the conversion coefficient K is corrected with more sufficient accuracy, and the defocus amount is calculated with more sufficient accuracy. Moreover, when a direction of a target image height is not included in the shape information, the information obtaining unit 115 calculates the conversion coefficients K about two image height that are adjacent to the target image height and obtains a conversion coefficient K for the target image height by interpolating calculation.

Moreover, when the shape information equivalent to several frame vignetting shapes for different moving amounts of the correction optical system is stored in the memory, the conversion coefficient K can be calculated with more sufficient accuracy.

Next, a third correction method will be described. The first and second correction methods correct the conversion coefficient K on the basis of the change of the frame vignetting shape that the frame vignetting information shows. The simpler third correction method calculates the conversion coefficient K on the basis of the information about the exit pupil distance EPD that the frame vignetting information shows.

When the correction optical system in the image pickup optical unit 101 is located in the center, the exit pupil distance EPD for every image height becomes a rotationally symmetrical system (a symmetrical optical system and a coaxial system), In the meantime, when the position of the correction optical system is shifted from the center, the exit pupil distance EPD varies according to the relative relation with the moving direction of the correction optical system even if the image height value is the same.

Accordingly, when the information obtaining unit performs a correction calculation process on the basis of the change amount of the exit pupil distance EPD stored in the memory of the image pickup apparatus 100, the correction coefficient K is calculated while reducing a calculation amount. For example, when the conversion coefficient K beforehand calculated in accordance with the exit pupil distance EPD is stored in the memory of the image pickup apparatus 100, the conversion coefficient K is obtained from the change information of the exit pupil distance EPD corresponding to the moving amount and the moving direction (the relative angle) of the correction optical system. As a result, the calculation amount for obtaining (correcting) the conversion coefficient K is reduced and the defocus amount is calculated with high accuracy at high speed by the simple configuration even in the time of the image stabilization.

Next, a fourth correction method will be described. The first, second, and third correction methods correct the conversion coefficient K. The fourth correction method corrects the shading correction coefficient SC. Accordingly, shading is described first.

As mentioned above by referring to FIG. 11A, FIG. 11B, and FIG. 11C, when the image pickup optical unit 101 and the image sensor 104 move relatively for the image stabilization, a pupil division state also varies. Since the pupil division becomes uneven in the peripheral region of the image sensor 104, the signal intensity distributions DA and DB become asymmetric as shown in the right sides in FIG. 11B and FIG. 11C, As a result, shading that is the intensity difference (intensity unevenness) between the first pupil intensity distribution corresponding to the A image and the second pupil intensity distribution corresponding to the B image occurs.

Since the pupil intensity distributions correspond to the focus detection signals (correlation signals) used for the focus detection as described in the first embodiment, occurrence of the shading may deteriorate the accuracy of focus detection. Accordingly, when the shading occurs, it is preferable to correct the focus detection signals.

For example, the controller 130 preferably corrects the focus detection signals (the first focus detection signal corresponding to the A image and the second focus detection signal corresponding to the B image) obtained in the step S104 prior to the correlation calculation in the step S105. The first focus detection signal and the second focus detection signal are corrected by multiplying a first shading correction coefficient SC1 and a second shading correction coefficient SC2, respectively. Each of the first shading correction coefficient SC1 and the second shading correction coefficient SC2 should be calculated on the basis of an image height of a focus detection area, an aperture value, and an exit pupil distance. It should be noted that the shading correction coefficients SC1 and SC2 varies as the correction optical system in the image pickup optical unit 101 shifts from the center.

As mentioned above, the frame vignetting shape varies with the shift of the correction optical system. The light beam passing through the frame vignetting shape projected on the pupil intensity distribution shown in FIG. 15 forms an image on the image sensor 104. Accordingly, when the frame vignetting shape varies, the intensity ratio between the first focus detection signal and the second focus detection signal also varies (that is, shading occurs).

Accordingly, the controller 130 (for example, the information obtaining unit 115) is able to improve the accuracy of the focus detection by correcting the shading correction coefficients SC1 and SC2. The shading correction coefficients SC1 and SC2 can be corrected according to the above-mentioned first, second, or third correction method.

For example, as well as the first correction method, an effective aperture value is calculated on the basis of the area change amount of the frame vignetting shape, and the shading correction coefficients SC1 and SC2 are calculated (corrected) using the calculated effective aperture value according to the method disclosed in Japanese Laid-Open Patent Publication (Kokai) No. 2015-11283 (JP 2015-11283A). Moreover, as well as the second correction method, the shading correction coefficients SC1 and SC2 are calculated (corrected) using the shape information corresponding to the frame vignetting shape and the light amounts of the first and second detection signals that are calculated from the pupil intensity distributions (the first and second pupil intensity distributions).

Moreover, as well as the third correction method, when the shading correction coefficients SC1 and SC2 calculated beforehand in association with the exit pupil distance EPD are stored in the memory of the image pickup apparatus 100, the shading correction coefficients SC1 and SC2 corresponding to the change information about the exit pupil distance EPD can be obtained.

As described above, since the conversion coefficient K and the shading correction coefficients SC1 and SC2 can be obtained (corrected) in accordance with the position of the correction optical system in the image pickup optical unit 101, the defocus amount is calculated with high accuracy at high speed by the simple configuration even in the time of the image stabilization. Thereby, the focus detection accuracy is improved.

The above-mentioned embodiments may be changed variously. Aspects of concrete modification will be exemplified hereinafter. Two or more aspects arbitrarily selected from the above embodiments and the following examples may be combined unless they are mutually contradictory.

The first embodiment employs the configuration (sensor-shift image stabilization, sensor shift system) that performs the image stabilization by moving the image sensor 104 (image sensor IS). However, the configuration (lens shift system) that performs the image stabilization by shifting the optical axis of the image pickup optical unit 101 using the correction optical system (shift optical system) may be employed. Such a configuration achieves the same technical effect as the first embodiment. This is because the shift of the optical axis changes the incident angle to the focus detection pixel and the baseline length L varies as a result as with the first embodiment. When the shift optical system of this example is employed, the reference information is corrected on the basis of the moving amount (shift amount) of the optical axis of the image pickup optical unit 101 that the moving amount detection unit 122 detects.

In the first embodiment, optical vignetting information about the image pickup optical unit 101 may be included in the reference information in addition to the aperture value. Such a configuration enables obtaining of more accurate baseline length information using the optical vignetting information added.

In the meantime, the second embodiment employs the configuration (lens shift system) that performs the image stabilization by shifting the correction optical system in the image pickup optical unit 101. However, the configuration (sensor shift system) that performs the image stabilization by moving the image sensor 104 (image sensor IS) may be employed. Such a configuration achieves the same technical effect as the second embodiment.

The image stabilization in the above-mentioned embodiments may be performed on the basis of the amount of image blur measured in the image pickup optical unit 101 (lens side), or may be performed on the basis of the amount of image blur measured in the body of the image pickup apparatus 100.

The correction operation in the above-mentioned embodiment is not always continued and can be omitted suitably by considering various conditions, such as required accuracy, a calculation amount, and a timing of feedback of an focusing operation. For example, when the difference between the exit pupil position LPO of the image pickup optical system and the image-sensor pupil position SPO is small, even when the image sensor 104 moves, variation of the baseline length L is small because the deviation between the exit pupil position LPO and the center position of the pupil-intensity-distribution characteristic is small.

Moreover, when the moving amount ΔX (coordinate change of the focus detection pixel) of the image sensor 104 is small and the variation of the center position of the pupil-intensity-distribution characteristic is small, the baseline length L is also small because the difference between the image-sensor pupil positions SPO and SPO1 before and after the correction is small. In the above-mentioned cases, that is, when the difference of the pupil positions is less than a first threshold, or when the relative moving amount of the image sensor 104 is less than a second threshold, a configuration that does not correct the reference information may be employed because the error due to the image stabilization is considered to be small. Since the above-mentioned configuration omits the correction operation for the reference information when the change of the baseline length L is small, the processing speed in the image pickup apparatus 100 is improved, and processing load can be reduced.

Moreover, for example, when the correction optical system in the image pickup optical unit 101 moves momentarily by sudden shake of the image pickup apparatus 100, the movement of the correction optical system is temporary and does not continue. Accordingly, a configuration that does not calculate (does not correct) the conversion coefficient K or the shading correction coefficient SC when movement of the correction optical system is momentary may be employed. That is, the reference information is corrected in a case where the correction optical system shifts from a center position over a predetermined period, and the reference information is not corrected in a case where the correction optical system returns to the center position within the predetermined period. The predetermined period as criteria of the above-mentioned determination can be arbitrarily set by considering various conditions, such as a capturing method, a lens characteristic of the image pickup optical unit 101, and a user's setting.

Moreover, a configuration that does not calculate (does not correct) the conversion coefficient K or the shading correction coefficient SC when the moving amount of the correction optical system exceeds a predetermined threshold may be employed. Since the above-mentioned configuration omits the correction operation for the conversion coefficient K or the shading correction coefficient SC suitably, the processing speed in the image pickup apparatus 100 is improved, and processing load can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-025581, filed Feb. 15, 2019, which is hereby incorporated by reference herein in its entirety.

What is claimed is:

1. An image pickup apparatus comprising:
a memory device that stores a set of instructions; and
at least one processor that executes the set of instructions to:
obtain optical parameters about an image pickup optical system and an image sensor as reference information;
correct the reference information based on a relative moving amount of the image sensor with respect to an optical axis of the image pickup optical system;
obtain a control parameter corresponding to corrected reference information by referring to an information data set that stores the control parameter used for finding a defocus amount for focus detection in association with the reference information; and
find the defocus amount based on the control parameter obtained.

2. The image forming apparatus according to claim 1, wherein the reference information includes an exit pupil position and an aperture value of the image pickup optical system and coordinate information about at least one focus detection pixel in the image sensor at a focus detection position as the optical parameters, and
wherein the at least one processor executes instructions in the memory device to correct the reference information based on the coordinate information in addition to the relative moving amount.

3. The image pickup apparatus according to claim 2, wherein the information data set stores baseline length specified by a pupil position of the image sensor as the control parameters, and
wherein the at least one processor executes instructions in the memory device to find a focus driving amount of the image pickup optical system based on the defocus amount found using the baseline length.

4. The image pickup apparatus according to claim 3, wherein the at least one processor executes instructions in the memory device to:
correct the pupil position of the image sensor included in the reference information based on the relative moving amount and the coordinate information, and
obtain the baseline length corresponding to a corrected pupil position of the image sensor.

5. The information processing apparatus according to claim 3, wherein the at least one processor executes instructions in the memory device to:
correct the exit pupil position and the aperture value of the image pickup optical system included in the reference information based on a change amount obtained from the relative moving amount and the coordinate information, and
obtain the baseline length corresponding to a corrected exit pupil position and a corrected aperture value of the image pickup optical system.

6. The image pickup apparatus according to claim 3, wherein the at least one processor executes instructions in the memory device to:
 correct the exit pupil position of the image pickup optical system included in the reference information based on a change amount obtained from the relative moving amount and the coordinate information,
 obtain the basline length corresponding to a corrected exit pupil position of the image pickup optical system, and
 correct the baseline length obtained based on the change amount.

7. The image pickup apparatus according to claim 3, wherein the at least one processor executes instructions in the memory device not to correct the reference information in a case where a difference between the exit pupil position of the image pickup optical system and the pupil position of the image sensor is less than a first threshold.

8. The image pickup apparatus according to claim 3, wherein the at least one processor executes instructions in the memory device not to correct the reference information in a case where the relative moving amount of the image sensor is less than a second threshold.

9. The image pickup apparatus according to claim 1, wherein the image pickup optical system is exchangeable to a body of the image pickup apparatus, and wherein the information data set stores a plurality of relationships between the optical parameters corresponding to a plurality of types of the image pickup optical system and the control parameters.

10. The image pickup apparatus according to claim 1, wherein the information data set stores baseline length specified by a pupil position of the image sensor as the control parameter, and
 wherein the at least one processor executes instructions in the memory device to:
 obtain the baseline length by referring to the information data set,
 correct a conversion coefficient obtained according to the baseline length based on frame vignetting information about a frame vignetting shape that varies according to the relative moving amount of the image sensor, and
 find the defocus amount using a corrected conversion coefficient.

11. The image pickup apparatus according to claim 10, wherein the at least one processor executes instructions in the memory device to correct the conversion coefficient based on one of an area change and a shape change of the frame vignetting shape described in the frame vignetting information.

12. The image pickup apparatus according to claim 10, wherein the at least one processor executes instructions in the memory device to correct the conversion coefficient based on an exit pupil distance of the image pickup optical system described in the frame vignetting information.

13. The image pickup apparatus according to claim 1, wherein the information data set stores baseline length specified by a pupil position of the image sensor as the control parameter, and
 wherein the at least one processor executes instructions in the memory device to:
 obtain the baseline length by referring to the information data s
 correct a shading correction coefficient used for correcting shading of focus detection signals obtained from a focus detection pixel of the image sensor based on frame vignetting information about a frame vignetting shape that varies according to the relative moving amount of the image sensor, and
 find the defocus amount based on an image displacement amount obtained from focus detection signals of which shading is corrected and a conversion coefficient obtained according to the baseline length.

14. The image pickup apparatus according to claim 13, wherein the at least one processor executes instructions in the memory device to correct the shading correction coefficient based on one of an area change and a shape change of the frame vignetting shape described in the frame vignetting information.

15. The image pickup apparatus according to claim 13, wherein the at least one processor executes instructions in the memory device to correct the shading correction coefficient based on an exit pupil distance of the image pickup optical system described in the frame vignetting information.

16. The image pickup apparatus according to claim 10, wherein the frame vignetting information corresponds to each relative angle of a correction optical system that shifts the optical axis of the image pickup optical system.

17. The image pickup apparatus according to claim 16, wherein the at least one processor executes instructions in the memory device to correct the conversion coefficient in a case where the correction optical system moves away from a center position over a predetermined period and not to correct the conversion coefficient in a case where the correction optical system returns to the center position within the predetermined period.

18. The image pickup apparatus according to claim 1, wherein image stabilization is performed by moving the image sensor.

19. The image pickup apparatus according to claim 1, wherein image stabilization is performed by shifting the optical axis of the image pickup optical system.

20. A control method for an image pickup apparatus, the control method comprising:
 obtaining optical parameters about an image pickup optical system and an image sensor as reference information;
 correcting the reference information based on a relative moving amount of the image sensor with respect to an optical axis of the image pickup optical system;
 obtaining a control parameter corresponding to corrected reference information by referring to an information data set that stores the control parameter used for finding a defocus amount for focus detection in association with the reference information; and
 finding the defocus amount based on the control parameter corresponding to corrected reference information.

21. A non-transitory computer-readable storage medium storing a control program causing a computer to execute a control method for an image pickup apparatus, the control method comprising:
 obtaining optical parameters about an image pickup optical system and an image sensor as reference information;
 correcting the reference information based on a relative moving amount of the image sensor with respect to an optical axis of the image pickup optical system; obtain a control parameter corresponding to corrected reference information by referring to an information data set that stores the control parameter used for finding a defocus amount for focus detection in association with the reference information; and finding the defocus amount based on the control parameter corresponding to corrected reference information.

\* \* \* \* \*